(12) United States Patent
Martin et al.

(10) Patent No.: US 10,621,071 B2
(45) Date of Patent: *Apr. 14, 2020

(54) FORMATION AND MANIPULATION OF TEST DATA IN A DATABASE SYSTEM

(71) Applicant: salesforce.com, inc., San Francisco, CA (US)

(72) Inventors: Jameison Bear Martin, Oakland, CA (US); Subho Sanjay Chatterjee, San Francisco, CA (US); Patrick James Helland, San Francisco, CA (US); Nathaniel Wyatt, San Francisco, CA (US); Thomas Fanghaenel, Oakland, CA (US); Terry Chong, Pleasanton, CA (US); Robert Frankus, Greenbrae, CA (US); Simon Wong, San Carlos, CA (US)

(73) Assignee: salesforce.com, inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/133,106

(22) Filed: Sep. 17, 2018

(65) Prior Publication Data
US 2019/0034321 A1    Jan. 31, 2019

Related U.S. Application Data

(63) Continuation-in-part of application No. 15/345,914, filed on Nov. 8, 2016, now Pat. No. 10,241,896.

(51) Int. Cl.
*G06F 11/36* (2006.01)
*G06F 8/60* (2018.01)
(Continued)

(52) U.S. Cl.
CPC .......... *G06F 11/3664* (2013.01); *G06F 8/60* (2013.01); *G06F 11/3672* (2013.01);
(Continued)

(58) Field of Classification Search
CPC .... G06F 11/1446–1469; G06F 11/3664–3672; G06F 11/3696;
(Continued)

(56) References Cited

U.S. PATENT DOCUMENTS 7,933,869 B2 * 4/2011 Becker .................. G06F 16/275
707/625
8,527,957 B2 * 9/2013 Thiele ................ G06Q 10/0639
717/127

(Continued)

OTHER PUBLICATIONS

International Search Report and Written Opinion dated Feb. 19, 2018 issued in Application No. PCT/US2017/060352.
(Continued)

*Primary Examiner* — Todd Aguilera
(74) *Attorney, Agent, or Firm* — Morris & Kamlay LLP

(57) ABSTRACT

Systems and methods are provided for creating a sandbox for an original tenant at a point in time, the original tenant having original tenant data stored in an immutable storage associated with an original tenant identifier, the original tenant data as of the sandbox creation point in time being a virtual snapshot of the original tenant data accessible by a sandbox tenant, where the sandbox tenant data can be changed without changing the original tenant data, and the original tenant data can be changed without changing the sandbox tenant data. A sandbox tenant is created by associating a sandbox tenant identifier with the virtual snapshot of the original tenant data and with sandbox tenant data created by the sandbox tenant subsequent to the sandbox creation point in time. In some implementations, the original
(Continued)

tenant is an original sandbox tenant, and the sandbox tenant is at least one new sandbox tenant.

28 Claims, 11 Drawing Sheets

(51) Int. Cl.
| | | |
|---|---|---|
| *G06F 21/53* | (2013.01) | |
| *G06F 16/21* | (2019.01) | |
| *G06F 16/23* | (2019.01) | |
| *G06F 16/84* | (2019.01) | |
| *G06F 21/64* | (2013.01) | |

(52) U.S. Cl.
CPC .......... *G06F 11/3696* (2013.01); *G06F 16/21* (2019.01); *G06F 16/23* (2019.01); *G06F 16/86* (2019.01); *G06F 21/53* (2013.01); *G06F 21/64* (2013.01); *G06F 2201/80* (2013.01); *G06F 2201/84* (2013.01); *G06F 2221/033* (2013.01)

(58) Field of Classification Search
CPC ...... G06F 21/53; G06F 21/64; G06F 2201/80; G06F 2201/84; G06F 16/11–128; G06F 16/21; G06F 16/23; G06F 16/86; G06F 16/245; G06F 2221/033; G06F 8/60
See application file for complete search history.

(56) References Cited

U.S. PATENT DOCUMENTS

| | | | |
|---|---|---|---|
| 9,208,188 B2 | 12/2015 | Ott | |
| 9,904,538 B2 | 2/2018 | Piccinini | |
| 2008/0162491 A1* | 7/2008 | Becker | ................ G06F 16/275 |
| 2010/0211548 A1 | 8/2010 | Ott | |
| 2012/0116849 A1* | 5/2012 | Thiele | .............. G06Q 10/06375 |
| | | | 705/7.37 |
| 2014/0379677 A1 | 12/2014 | Driesen | |
| 2016/0048844 A1 | 2/2016 | Vogt, Jr. | |
| 2017/0060569 A1 | 3/2017 | Piccinini | |

OTHER PUBLICATIONS

International Preliminary Report on Patentability for Application No. PCT/US2017/060352, dated May 23, 2019, 8 pages.

* cited by examiner

FIG. 2A1
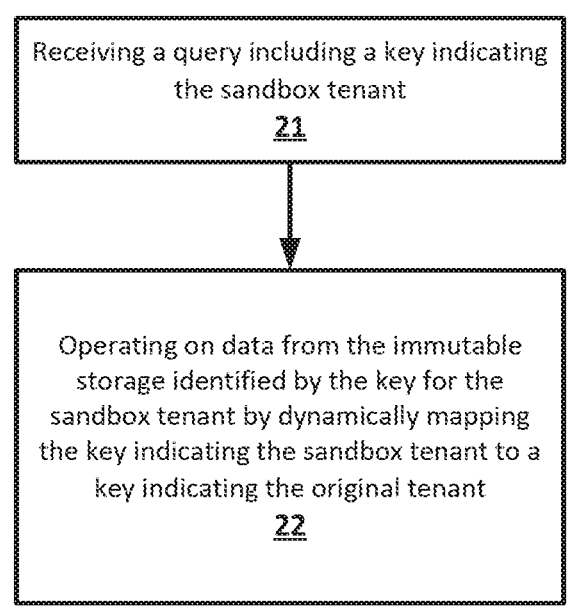

FIG. 2A2
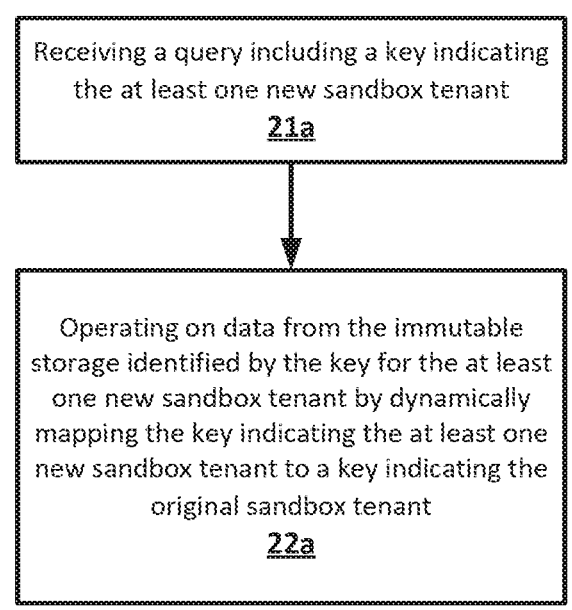

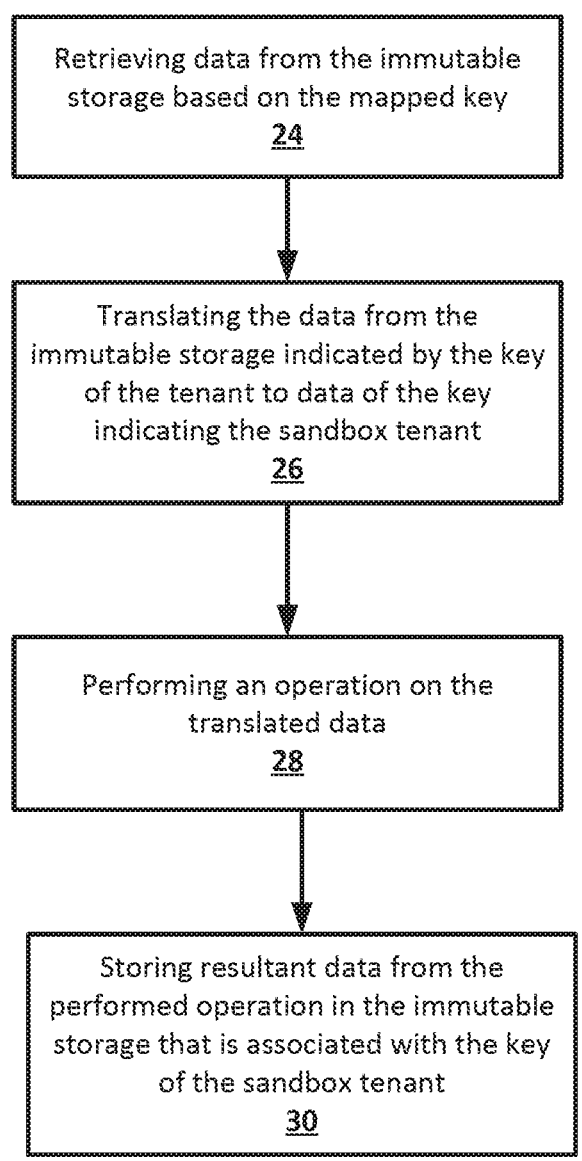

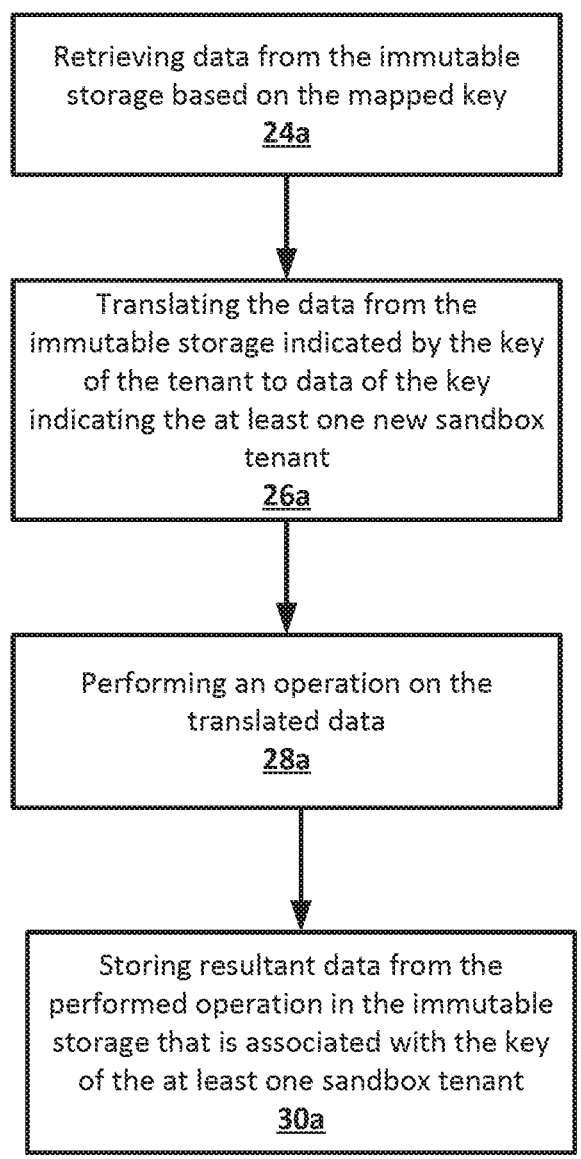
FIG. 2B2

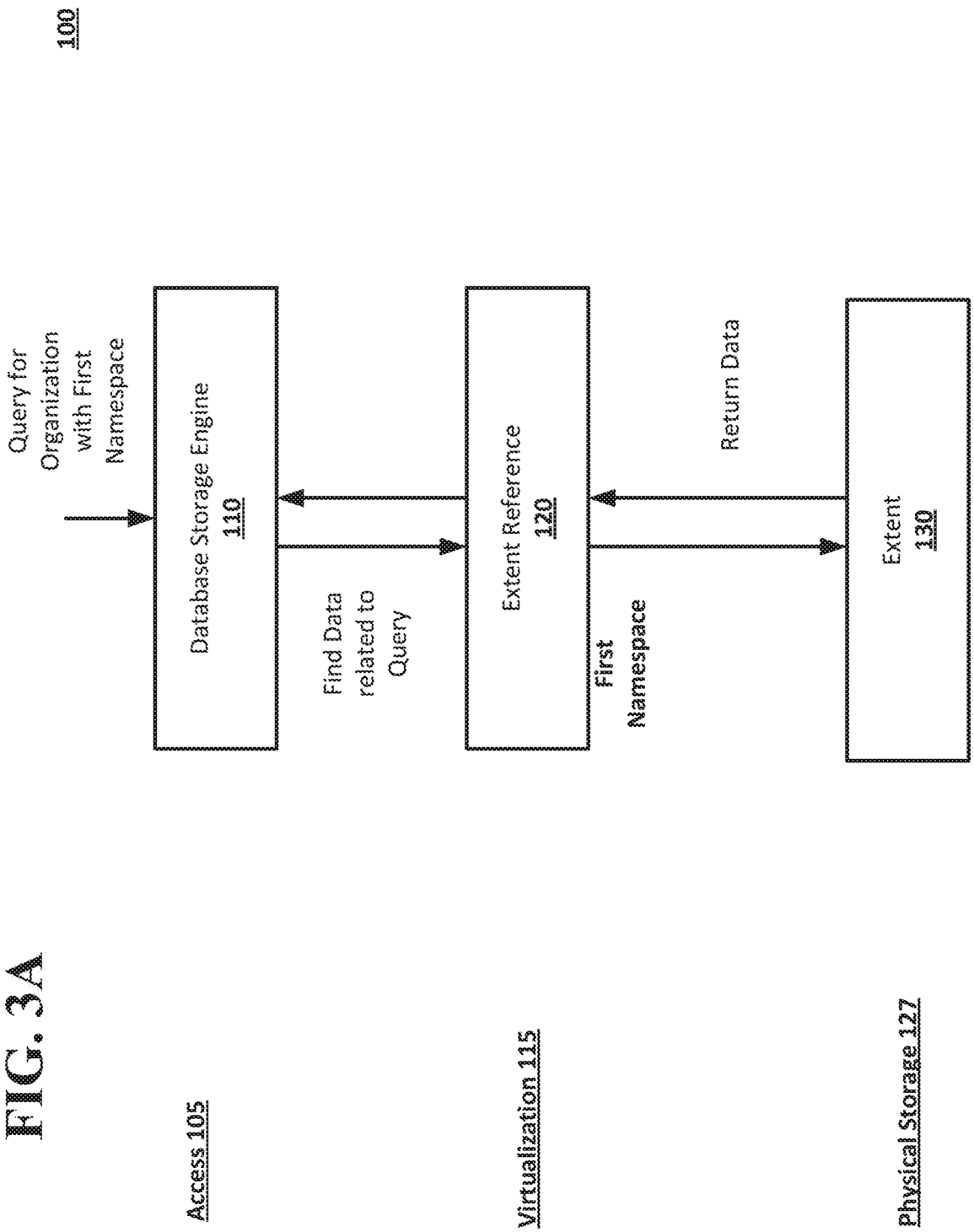

FORMATION AND MANIPULATION OF TEST DATA IN A DATABASE SYSTEM

BACKGROUND

Test systems are typically formed for applications, and are separate from production systems. Such systems, which can be referred to as "sandboxes," may be used to test new features and versions of the applications. In known systems, live production data cannot be used for sandboxing because the testing would corrupt the production data. Therefore, separate copies of customer data are made that are used for testing and development. Creating the separate copies of the database for a typical sandbox system is slow, consumes a significant amount of computational resources, is prone to error and can take up substantial data storage resources. In many cases, it is not practical to copy all of data in a single transaction, so the copied data may not be transactionally consistent. In that case, the testing of the application may not be successful in determining the operational functionality of the features of the application, because the sandbox data being used in testing may not be accurate. In some cases, the inconsistent data can be reconciled before the sandbox can be used, which can be time consuming and require substantial processor and memory resources.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

FIGS. 2A1-2A2 show example methods of receiving a query and operating on data from the immutable storage by dynamic mapping a tenant identifier according to implementations of the disclosed subject matter.

FIGS. 2B1-2B2 show example methods of retrieving and translating data from the immutable storage, and performing an operation on the translated data according to implementations of the disclosed subject matter.

FIG. 3A shows an example system and method of storing and retrieving data using a virtualization layer according to an implementation of the disclosed subject matter.

DETAILED DESCRIPTION

Figure 1A:
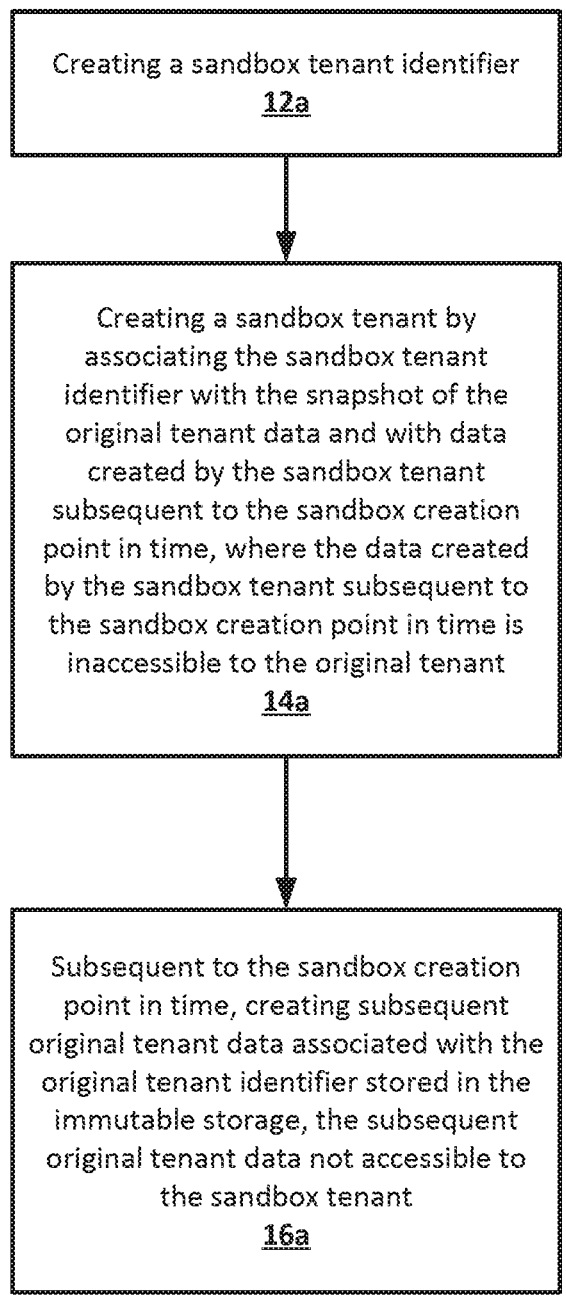
FIG. 1A shows an example method of creating a sandbox for sandbox tenant data from an original tenant, and creating subsequent immutable original tenant data for the original tenant according to an implementation of the disclosed subject matter.

Implementations of the disclosed subject matter can create and run one or more sandboxes based on input from one or more authorized users that are associated with one or more tenants of a database system without having to duplicate production data or operate on duplicated production data. Such sandboxes can be established more quickly than known sandboxes at much lower cost in terms of processor resources, data storage and persistence resources, and/or datapath (e.g., communication network) resources. In some implementations, the disclosed system reads production data, making the system inherently accurate. No consistency checks or other corrective measures need to be taken with respect to the data being tested. It can also produce more accurate test results for an application because the integrity of the data being tested can be better than in known sandbox implementations.

In some implementations, one or more new sandboxes may be created from an original sandbox. In some cases, an "original sandbox" may be a sandbox created based upon existing non-sandbox tenant data and an "original sandbox tenant" may be the tenant associated with the original sandbox, for example as disclosed in U.S. Application Pub. No. 2018/0129585, the disclosure of which is incorporated by reference in its entirety. For example, the original sandbox may be a sandbox that is created from original tenant data of an original tenant, as discussed throughout.

The original sandbox may be formed from a template to include one or more of code, schema, records, and test data from at least one data source. Verification testing of the code and/or test data may be performed prior to sandbox duplication. In this implementation, one or more duplicate sandboxes may be created having the same contents which may be, for example, provided to developers. In some implementations, records may be removed before being copied to the original sandbox tenant and/or the new sandbox tenants so that sensitive information that may be included in customer records is not provided to outside developers. The original sandbox may be configured with test data using the template, and one or more copies of the original sandbox may be made to create one or more new sandbox tenants. That is, multiple developer environments may be created is less time than using traditional sandboxing techniques, and the data in the new sandbox tenants may accurately match the original sandbox tenant, and no consistency checks or other corrective measures need to be taken.

In implementations of the disclosed subject matter, one or more authorized users that are associated with one or more tenants of a database system may create an original sandbox tenant and/or one or more new sandbox tenants for a database. An authorized user of the database system may be a user that has security access rights to one or more tenants of the database system. For example, the user may provide a password and/or other information (e.g., security code, bioinformatics, or the like) to the database system, which may determine whether the user is an authorized used based on the provided information. If the provided information matches stored information of the database system, the user may be determined to be an authorized user and may be granted access to the database system.

The original sandbox tenant and/or the one or more new sandbox tenants may have access to data associated with corresponding original sandbox tenant keys or new sandbox keys, while an original tenant has access to data associated with original tenant keys. The range of keys associated with a tenant (e.g., an original tenant, an original sandbox tenant, one or more new sandbox tenants, or the like) can be all or part of a tenant namespace. Ordinarily, one tenant has no access to another tenant's namespace. However, in implementations of the described subject matter, a combination of hardware and software can create a correspondence between certain sandbox tenant keys and original tenant keys to provide the sandbox tenant read access to point in time data associated with the original tenant. In this way, the sandbox tenant can use original tenant data without having to copy the original tenant data to the sandbox tenant's namespace. This point in time data can be used by the sandbox to test the application. In some implementations correspondence may be created between certain new sandbox tenant keys and original sandbox tenant keys to provide the new sandbox tenant read access to point in time data associated with the original sandbox tenant. The new sandbox tenant can use original sandbox tenant data without having to copy the original sandbox tenant data to the new sandbox tenant's namespace. One or more new sandbox tenants may be created from the original sandbox tenant, and may be used, for example, by developers to test an application.

New transaction data generated by the sandbox tenant can be written to the sandbox tenant namespace not accessible to the original tenant. New transaction data generated by the original tenant can be written to original tenant namespace not accessible to the sandbox tenant. In this way, new sandbox tenant data does not corrupt original tenant (production) data, and new original tenant data (e.g., which may be referred to as subsequent immutable original tenant data) does not corrupt the test data being read and written by the sandbox to test the application. Similarly, new transaction data generated by the at least one sandbox tenant can be written to the at least one sandbox tenant namespace not accessible to the original sandbox tenant. New transaction data generated by the original sandbox tenant can be written to original sandbox tenant namespace not accessible to the at least one new sandbox tenant. The at least one new sandbox tenant data does not corrupt original sandbox tenant data, and new original sandbox tenant data does not corrupt the test data being read and written by the at least one new sandbox to test the application. These implementation can be used with a relational database that stores persistent contents of records, e.g., in a Log Structured Merge (LSM) tree.

Authorized users associated with one or more tenants of the database systems of the disclosed implementations can more quickly create and run sandboxes that use only a fraction of the data storage and persistence resources, processor resources, and/or datapath (e.g., communication network) resources used by traditional sandbox systems.

In general, applications can be run on servers for production systems, and test systems and/or developer systems may be separate from the production systems. The test systems and/or developer systems may be used to test new features and/or versions of the applications. The production system applications may be run on a on a company's or an organization's servers (i.e., running an application "on premises"), or by running an application in a cloud-based computing environment (e.g., where the servers are remote from the company's or organization's servers).

Implementations of the disclosed subject matter provide systems and methods for authorized users associated with one or more tenants of a database system to create sandboxes (e.g., an original sandbox and/or new sandboxes, which are duplicates of the original sandbox), which use at least a portion company data, organization data, and/or customer data (i.e., the production data) for testing and development by creating sandbox data based on the production data, without altering the production data. As used throughout, customer data may refer to any portion of company data and/or organization data. In some implementations, some customer data is removed from an original sandbox, and test data is added to the original sandbox before it is replicated to form one or more new sandboxes. Original sandboxes may be created using a template, and may include code, schema, records, and/or test data from at least one data source. In some implementations, code and/or test data of an original sandbox tenant may be deployed, and verification testing of the deployed code and test data may be performed before the original tenant is duplicated to create at least one new sandbox tenant, which may be distributed to developers.

In some implementations, one or more features of the application may be tested using the sandbox data. In some implementations, developers may use one or more of the sandboxes to test application code. Once the features of the application have been tested, the sandbox (e.g., the original sandbox and/or new sandboxes) can be deleted without impacting the production data. The sandbox may be deleted by removing references (e.g., pointers) to the sandbox data. The removal of the references in a sandbox deletion operation may be instantaneous, and utilizes fewer processor, data storage, and/or datapath resources than with traditional sandboxing systems. In some implementations, the references of the sandbox data may not be copied forward in a data merge operation to maintain the references, so the sandbox may be effectively removed, as there are no longer any active references to the sandbox. The deletion operations may be similar and/or the same for original sandbox tenants and/or new sandbox tenants.

With traditional systems and methods, the process of sandboxing customer data involves creating a new tenant for the sandbox on a destination database instance. The tenant data is copied to the target database instance while the tenant is "live" on the source instance. With the traditional systems and methods, it is necessary to run a consistency check to determine if copied data is transactionally consistent. Upon completion of the consistency check, the tenant can be activated on the destination database instance, which may include, for example, the sandbox.

The disclosed implementations overcome important limitations in traditional sandboxing technology. More specifically, creating a traditional sandbox is slow, in that it takes time to copy all of the necessary data, and check to see if the copied data is consistent with the original data set. Such traditional systems and methods are also resource-heavy (i.e., they require a substantial amount of computing, datapath, network, and/or storage resources to copy an entire set of data), and error prone. For example, the data may not be copied correctly, may be missing portions of data, data may be corrupted, or the like. That is, creating a sandbox using traditional systems and methods involves copying all the rows for the tenant into a new sandboxed tenant. Copying row-by-row may be slow and resource intensive, on both the source and the target database, and it may effectively double the tenant's storage. It is also not practical to copy all of a tenant's data in a single transaction, so there may be a complicated process of reconciling inconsistent data before the sandbox can be made available to the customer.

In implementations of the disclosed subject matter, systems and methods are provided that may more quickly generate an original sandbox and/or one or more new sandboxes, which may be duplicates of the original sandbox, and may use substantially less storage space than with traditional sandboxing systems. The systems and methods of the disclosed subject matter generate a sandbox with data that may be fully consistent with original tenant data and/or original sandbox data when new sandboxes are created that are duplicates of the original sandbox tenant, without having to perform error checking, as may need to be performed when using standard sandboxing methods.

As described in detail below, an implementation of the disclosed subject matter may implement a sandbox (e.g., an original sandbox and/or a new sandbox) using an immutable storage such as a LSM tree, a single key space rooted by a tenant identifier (i.e., "tenant ID"), and by using persistence virtualization. The persistence may be made up of extents. As understood in the art and as used herein, an "extent" refers to a region of storage, typically continuous within a storage medium, which may be used to store data. Extents may be immutable and may be ordered by key. That is, the extents may be immutable in that they may not be modified after they are created, such that the region and data associated with the extent within the storage medium are not updated, but may be deleted in the future. For example, the extents that are no longer referred to in sandbox data may be deleted, as the references may not be copied forward in a data merge operation to maintain the references. That is, the sandbox and its extents may be effectively removed, as there are no longer any active references to the sandbox. New data can be added to the database, and new extents can be created. Extents can be stored in a shared storage that may be analogous to a distributed filesystem.

An extent reference may be used as a logical reference to a physical extent that is stored in physical storage (e.g., a storage device), and may be used to virtualize access to the physical storage. To create a sandbox (e.g., an original sandbox and/or a new sandbox) according to the systems and methods of the disclosed subject matter, an authorized user of the database system that is associated with the source tenant may request that a new extent reference may be added for each extent that contains keys for the source tenant (e.g., an original tenant and/or and original sandbox tenant), with instructions to translate the tenant IDs in a key range from the source (i.e., an original tenant or an original sandbox tenant) to the target (i.e., an original sandbox tenant or one or more new sandbox tenants). The translation can map certain read operations issued by requests generated from users associated with the sandbox tenant onto original tenant data (e.g., data for an original tenant and/or original sandbox tenant) as of a point in time. The point in time data can be delineated by the key range. Subsequent transactions written by the original tenant and/or original sandbox tenant may have no effect on the point in time data being referenced for the transactions. Write operations by the original sandbox tenant and/or one or more new sandbox tenants may be stored under a different key (the original sandbox tenant key or the new sandbox tenant key) than the original tenant data (or original sandbox tenant), so sandbox write operations do not corrupt any original data (e.g., original tenant data and/or original sandbox data). This allows for quick formation of a sandbox, as it only requires metadata changes and copying of metadata, and no underlying data needs to be copied. This may be desirable over typical sandbox systems, which require substantial resources to copy tenant data and store it in a new location for a sandbox, and determine if the data has been accurately copied. The resources utilized in traditional sandboxing systems and methods may include increased storage device capacity, processor overhead in managing the copying and determining if it was accurately performed, time needed to copy and to check the accuracy, and the like. In some implementations, the original sandbox may be formed by using traditional copying of data, and at least one new sandbox may be created using the extent reference, keys, and virtualization as described throughout.

In an implementation of the disclosed subject matter, a method is provided for an authorized user of a database system that is associated with an original tenant to create a sandbox for the original tenant at a point in time, the original tenant having original tenant data stored in an immutable storage associated with an original tenant identifier, the original tenant data as of the sandbox creation point in time being a virtual snapshot of the original tenant data accessible by a sandbox tenant, where the sandbox tenant data may be changed without changing the original tenant data, and the original tenant data may be changed without changing the sandbox tenant data. The method may include creating a sandbox tenant identifier. The virtual snapshot may be such that the original tenant data is made available to a sandbox tenant so that the sandbox tenant can access the original tenant data in the same manner as if a copy of the original tenant data was made, without copying underlying data. A sandbox tenant may be created at the request of the associated authorized user by associating the sandbox tenant identifier with the virtual snapshot of the original tenant data and with sandbox data created by the sandbox tenant subsequent to the sandbox creation point in time. The sandbox data created and/or modified by the sandbox tenant subsequent to the sandbox creation point in time may be inaccessible to the original tenant.

Subsequent to the sandbox creation point in time, new or updated original tenant data may be created and may be associated with the original tenant identifier stored in the immutable storage. This subsequent new or updated original tenant data may not be accessible to users who are accessing the sandbox tenant. Users of the original tenant may access tenant data created both before and after the sandbox creation point in time that is stored in the immutable storage. That is, authorizes users associated with the original tenant can read and write data the same as it could before the sandbox was created. The subsequent original tenant data is written as new or updated original tenant data and this new or updated data does not alter older original tenant data stored in the immutable storage.

In an implementation of the disclosed subject matter, a system having at least one storage device is provided so that one or more authorized users associated with an original tenant in the database system may create a sandbox for the original tenant at a point in time. This is done by creating a new sandbox tenant identifier. The original tenant may have tenant data stored in an immutable storage of the at least one storage device associated with the original tenant identifier. The original tenant data, as of the sandbox creation point in time, may be used to provide a virtual snapshot of immutable original tenant data that the implementation makes accessible to a sandbox tenant. That is, the original tenant data may be made available to a sandbox tenant so that the sandbox tenant can access the original tenant data in the same manner as if a copy of the original tenant data was made. Similarly, the original tenant may also access the same original tenant data. Neither can change this virtual snapshot, as the underlying data of the virtual snapshot is immutable.

However, changes and/or additions submitted either to the original tenant data or the sandbox tenant data are not stored so as to overwrite or otherwise replace the original tenant data. Subsequently, changes and/or additions made by authorized users associated with either the original tenant or the snapshot tenant can be stored without changing the virtual snapshot. Rather, data for the original tenant may be stored in immutable extents and data for the sandbox tenancy may be stored in separate immutable extents as disclosed in further detail herein. Mechanisms, such as pointers or the like, to these additional extents may permit the original tenant data to be changed and/or augmented without changing the sandbox tenant data. The system may create a sandbox tenant identifier, and may create the sandbox tenant by associating the sandbox tenant identifier with access to the virtual snapshot of the tenant data and with data created by authorized users of the sandbox tenant (e.g., in an application and/or with the database system, or the like) subsequent to the sandbox creation point in time. The data created by the sandbox tenant and/or the authorized user of the database system associated with the sandbox tenant subsequent to the sandbox creation point in time may be inaccessible to the original tenant. Subsequent to the sandbox creation point in time, the system may create immutable tenant data associated with the original tenant identifier stored in the immutable storage of the at least one storage device. This subsequent immutable original tenant data may not be accessible to the sandbox tenant. The original tenant and/or the authorized user of the database system associated with the original tenant may access original tenant data created both before and after the sandbox creation point in time that is stored in the immutable storage. The subsequent immutable original tenant data is created as new original tenant data that does not alter other tenant data (e.g., the original and the sandbox tenant data) stored in the immutable storage. The authorized user associated with the original tenant of the database system may have access to the subsequent immutable original tenant data and the new original tenant data.

In an implementation of the disclosed subject matter, an original sandbox tenant may be used to create one or more new sandbox tenants, and may be duplications of the original sandbox tenant. A method is provided for an authorized user of a database system that is associated with an original sandbox tenant to create at least one new sandbox for the original sandbox tenant at a point in time, the original sandbox tenant having original sandbox tenant data stored in an immutable storage associated with an original sandbox tenant identifier, the original sandbox tenant data as of the creation point in time of at least one new sandbox being a virtual snapshot of the original sandbox tenant data accessible by at least one new sandbox tenant, where the at least one new sandbox tenant data may be changed without changing the original sandbox tenant data, and the original sandbox tenant data may be changed without changing the at least one new sandbox tenant data. The method may include creating at least one new sandbox tenant identifier. The virtual snapshot may be such that the original sandbox tenant data is made available to at least one sandbox tenant so that the at least one sandbox tenant can access the original sandbox tenant data in the same manner as if a copy of the original sandbox tenant data was made, without copying underlying data. At least one new sandbox tenant may be created at the request of the associated authorized user by associating the at least one sandbox tenant identifier with the virtual snapshot of the original sandbox tenant data and with at least one new sandbox data created by the at least one new sandbox tenant subsequent to the creation point in time of the at least one new sandbox. The at least one new sandbox data created and/or modified by the at least one new sandbox tenant subsequent to the creation point in time of the at least one new sandbox may be inaccessible to the original sandbox tenant.

Subsequent to the creation point in time of the at least one new sandbox, new or updated original sandbox tenant data may be created and may be associated with the original sandbox tenant identifier stored in the immutable storage. This subsequent new or updated original sandbox tenant data may not be accessible to users who are accessing the at least one new sandbox tenant. Users of the original sandbox tenant may access original sandbox tenant data created both before and after the creation point in time of the at least one new sandbox that is stored in the immutable storage. That is, authorizes users associated with the original sandbox tenant can read and write data the same as it could before the at least one new sandbox was created. The subsequent original sandbox tenant data is written as new or updated original sandbox tenant data and this new or updated data does not alter older original sandbox tenant data stored in the immutable storage.

In an implementation of the disclosed subject matter, a system having at least one storage device is provided so that one or more authorized users associated with an original sandbox tenant in the database system may create at least one new sandbox for the original sandbox tenant at a point in time. This is done by creating at least one new sandbox tenant identifier. The original sandbox tenant may have tenant data stored in an immutable storage of the at least one storage device associated with the original sandbox tenant identifier. The original sandbox tenant data, as of the at least one sandbox creation point in time, may be used to provide a virtual snapshot of immutable original sandbox tenant data that the implementation makes accessible to at least one new sandbox tenant. That is, the original sandbox tenant data may be made available to at least one new sandbox tenant so that the at least one new sandbox tenant can access the original sandbox tenant data in the same manner as if a copy of the original sandbox tenant data was made. Similarly, the original sandbox tenant may also access the same original sandbox tenant data. Neither can change this virtual snapshot, as the underlying data of the virtual snapshot is immutable.

Changes and/or additions submitted either to the original sandbox tenant data or the at least one new sandbox tenant data are not stored so as to overwrite or otherwise replace the original sandbox tenant data. Subsequently, changes and/or additions made by authorized users associated with either the original sandbox tenant or the at least one new sandbox tenant can be stored without changing the virtual snapshot. Data for the original sandbox tenant may be stored in immutable extents and data for the sandbox tenancy may be stored in separate immutable extents as disclosed in further detail herein. Pointers, or the like, to these additional extents may permit the original sandbox tenant data to be changed and/or augmented without changing the at least one new sandbox tenant data. The system may create at least one new sandbox tenant identifier, and may create the at least one new sandbox tenant by associating the at least one new sandbox tenant identifier with access to the virtual snapshot of the original sandbox tenant data and with data created by authorized users of the at least one new sandbox tenant (e.g., in an application and/or with the database system, or the like) subsequent to the creation point in time of the at least one new sandbox. The data created by the at least one new sandbox tenant and/or the authorized user of the database system associated with the at least one new sandbox tenant subsequent to the creation point in time of the at least one new sandbox may be inaccessible to the original sandbox tenant. Subsequent to the creation point in time of the at least one new sandbox, the system may create immutable tenant data associated with the original sandbox tenant identifier stored in the immutable storage of the at least one storage device. This subsequent immutable original sandbox tenant data may not be accessible to the at least one new sandbox tenant. The original sandbox tenant and/or the authorized user of the database system associated with the original sandbox tenant may access original sandbox tenant data created both before and after the creation point in time of the at least one new sandbox that is stored in the immutable storage. The subsequent immutable original sandbox tenant data is created as new original sandbox tenant data that does not alter other tenant data (e.g., the original sandbox tenant data and the at least one new sandbox tenant data) stored in the immutable storage. The authorized user associated with the original sandbox tenant of the database system may have access to the subsequent immutable original sandbox tenant data and the new original sandbox tenant data.

FIG. 1A shows an example method 10a of creating a sandbox tenant using an original tenant according to an implementation of the disclosed subject matter.

In particular, the method 10a of FIG. 1A may be used by the authorized user associated with an original tenant in the database system to create a sandbox for the original tenant at a point in time. The method 10a may be used in connection with the systems shown in FIGS. 3A-6, as described in detail below. The original tenant may have original tenant data stored in an immutable storage (e.g., the physical storage shown in FIGS. 3A-3B, storage 810 of second computer 800 shown in FIG. 5, database systems 1200a-d of FIG. 6, and the like) associated with a tenant identifier. In the method 10a, the sandbox tenant data as of the sandbox creation point in time may be a virtual snapshot of the original tenant data and be accessible to the sandbox tenant. The sandbox tenant data can be changed without changing the original tenant data, and the original tenant data can be changed without changing the sandbox tenant data. The snapshot may be virtual in that both the original tenant and the sandbox use the same immutable data for data (or versions of data that existed as of the creation of the sandbox).

A sandbox tenant identifier may be created at operation 12a. The sandbox tenant identifier may be created by a database system, such as a server, cloud server, and/or database, or the like. For example, the sandbox tenant identified may be created by the system 100 shown in FIGS. 3A-3B, the server 502 and/or server 504 shown in FIG. 4A, the central component 700 and/or the second computer 800 shown in FIG. 5, and/or database systems 1200a-1200d shown in FIG. 6.

At operation 14a, the database system may create a sandbox tenant by associating the sandbox tenant identifier with the virtual snapshot of the original tenant data. The sandbox tenant may be associated with an authorized user of the database system. The sandbox tenant identifier may be associated with sandbox data created by the sandbox tenant subsequent to the sandbox creation point in time. The sandbox data created by the sandbox tenant subsequent to the sandbox creation point in time may be inaccessible to the original tenant.

Figure 3B:
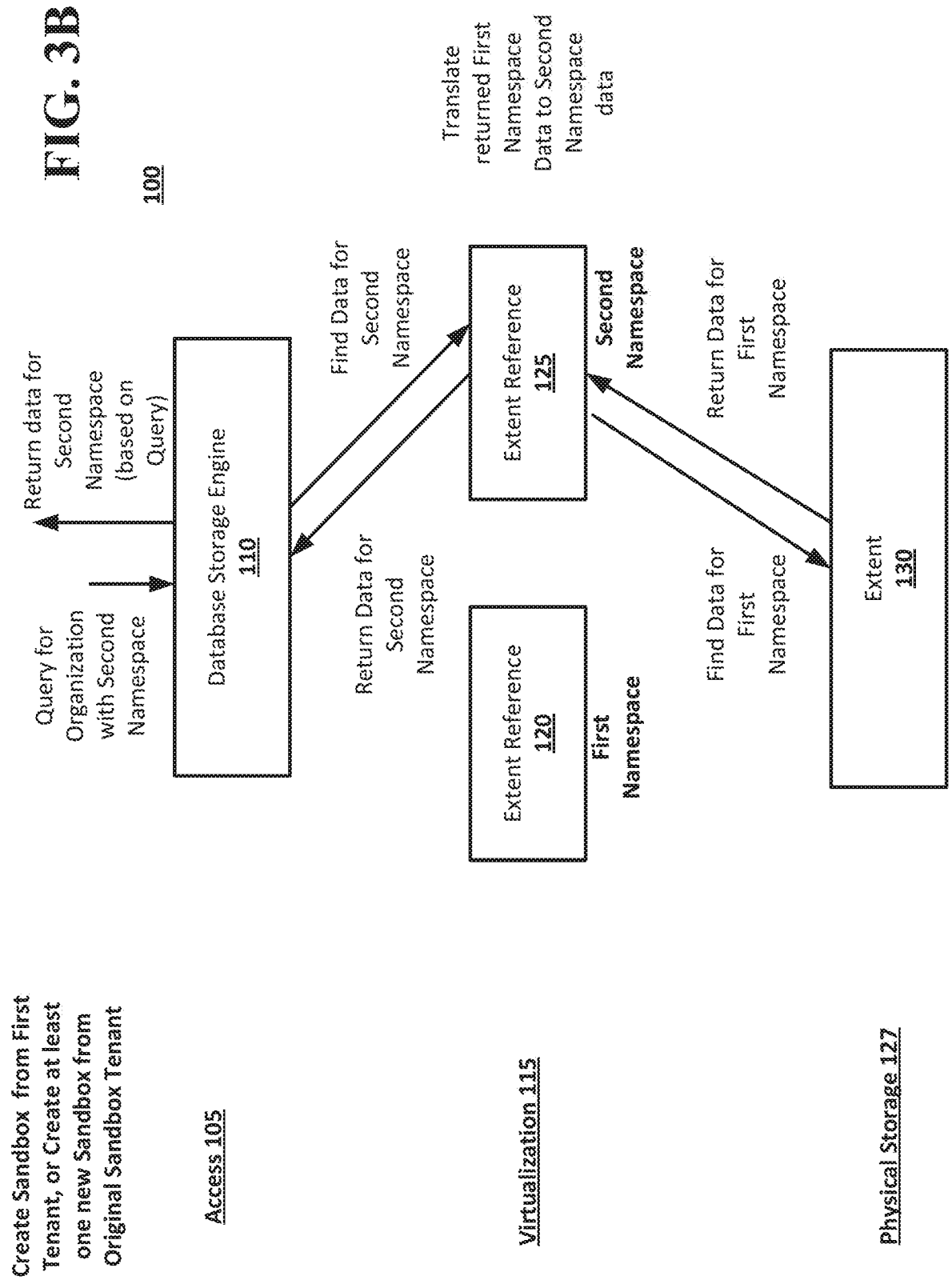
FIG. 3B shows retrieving data from the sandbox of a database system by translating the data according to an implementation of the disclosed subject matter.
Figure 5:
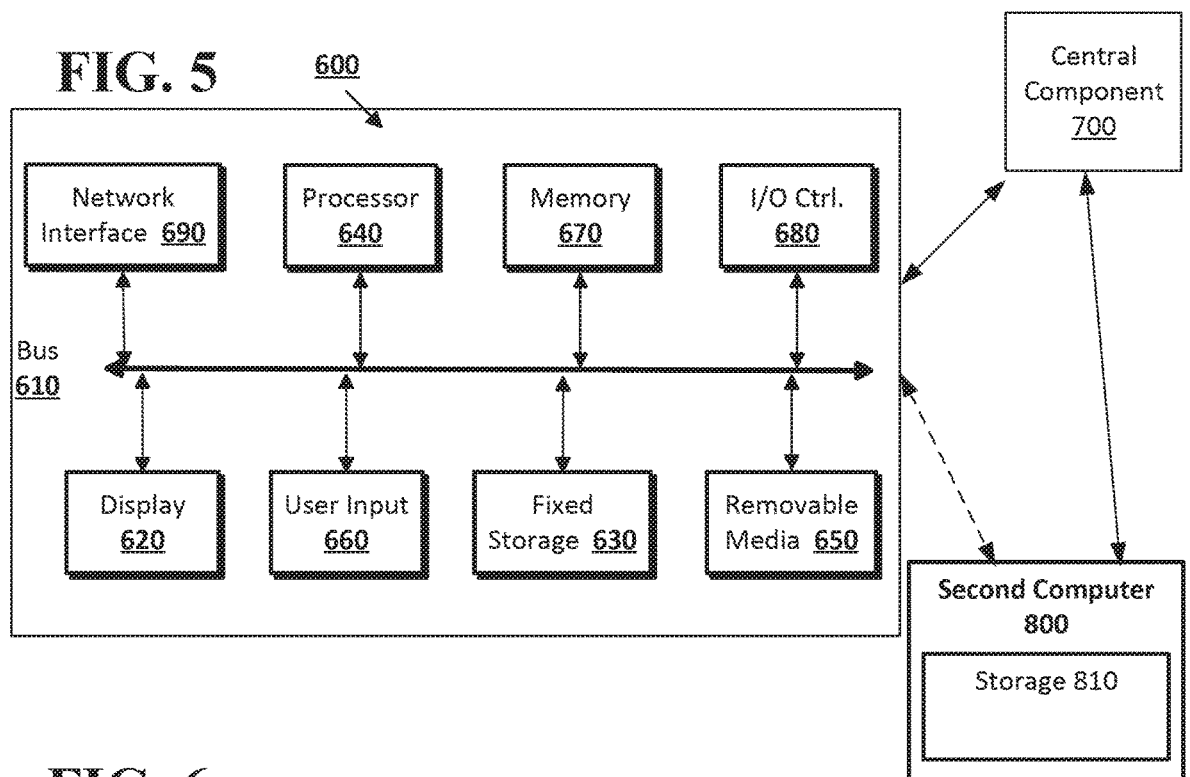
FIG. 5 shows a computer according to an implementation of the disclosed subject matter.
Figure 6:
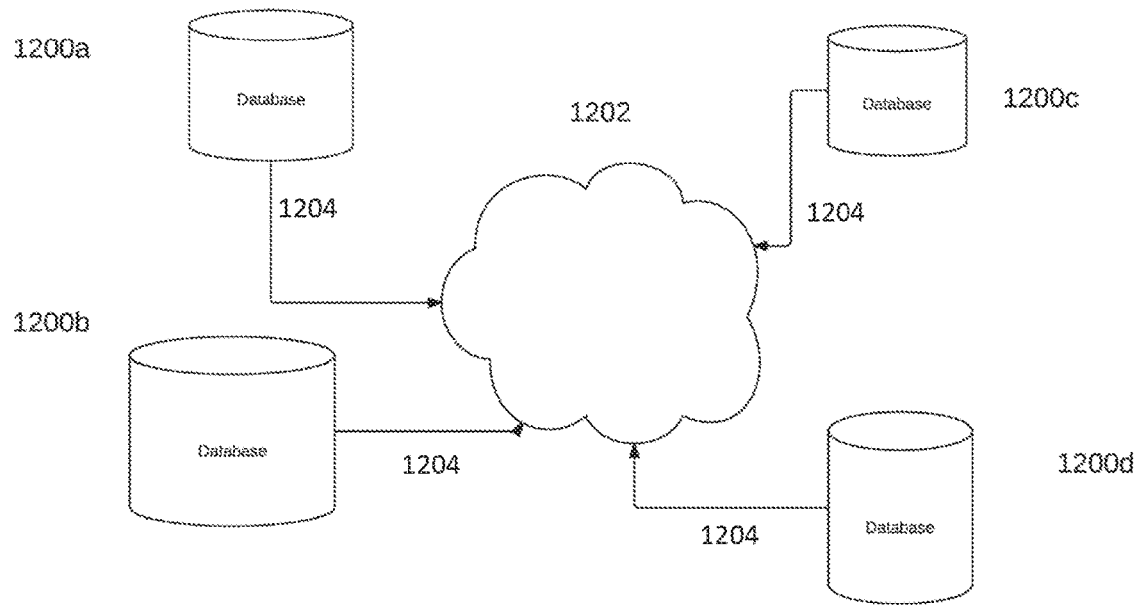
FIG. 6 shows a network configuration according to an implementation of the disclosed subject matter.

At operation 16a, subsequent to the sandbox creation point in time, the database system may create subsequent original tenant data associated with the original tenant identifier stored in the immutable storage (e.g., the physical storage shown in FIGS. 3A-3B, storage 810 of second computer 800 shown in FIG. 5, database systems 1200a-d of FIG. 6, and the like). The subsequent original tenant data may be created by the database system by an authorized user that is associated with the original tenant. For example, one or more applications controlled by the authorized user associated with the original tenant may perform one or more operations that create the subsequent original tenant data. The subsequent immutable original tenant data may not be accessible to the sandbox tenant. That is, the original tenant may access original tenant data created both before and after the sandbox creation point in time that is stored in the immutable storage. The subsequent immutable original tenant data is written as new original tenant data that does not alter older original tenant data (e.g., the original and the sandbox tenant data) stored in the immutable storage and the original tenant cannot access the data that is created or augmented by the sandbox tenant.

Figure 1B:
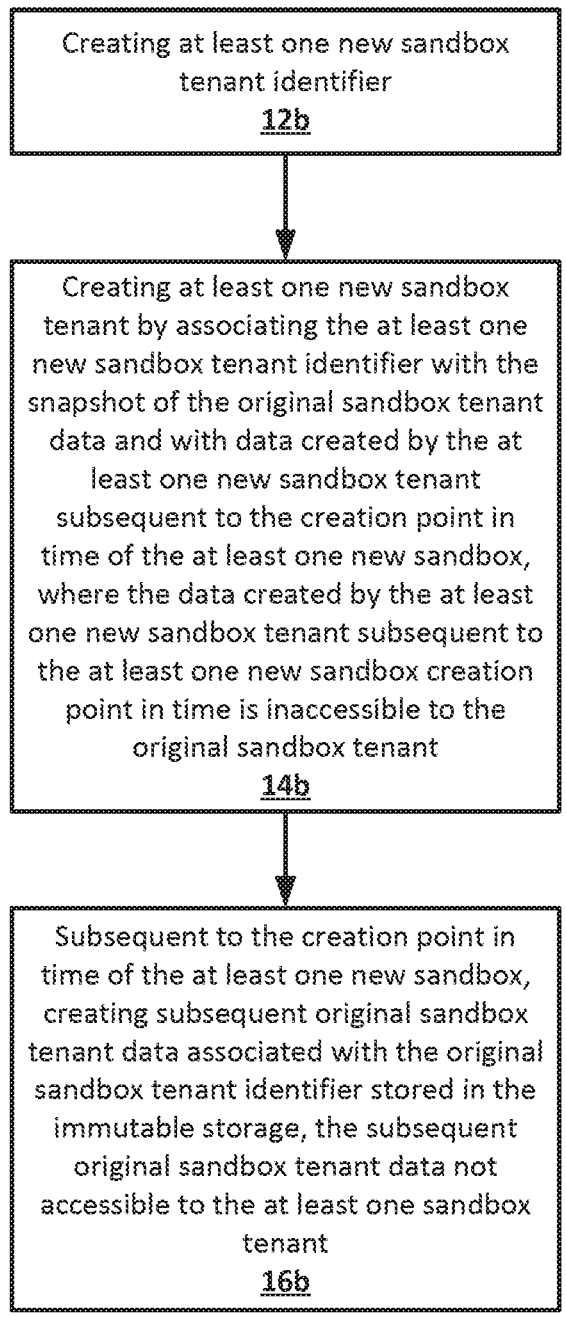
FIG. 1B shows an example method of creating at least one new sandbox for at least one new sandbox tenant data from an original sandbox, and creating subsequent immutable original sandbox tenant data for the original sandbox tenant according to an implementation of the disclosed subject matter.

FIG. 1B shows an example method 10b of creating at least one new sandbox tenant using an original sandbox tenant according to an implementation of the disclosed subject matter. The method 10b of FIG. 1B may be used by the authorized user associated with an original sandbox tenant in the database system to create at least one new sandbox for the original sandbox tenant at a point in time. An original sandbox tenant may be created the original sandbox tenant may be created using a template. Code, schema, records, and/or test data may be selected and/or copied from at least one data source (e.g., from production data) to create the original sandbox tenant using the template. For example, data may be extracted from a production data source, and may be copied row-by-row to the original sandbox tenant. In some implementations, records (e.g., customer records) may not be copied from the at least one data source (e.g., a production data source) to the original sandbox tenant. In some implementations, records (e.g., customer records) are removed to create the original sandbox tenant, as they may include sensitive information (e.g., data that should not provided outside of an organization, such as to external developers). Instead, test data may be used in creating the original sandbox tenant. The test data may be selected from selected and copied and/or independently generated and copied to the original sandbox tenant.

In some implementations, test data may be extracted from one or more data sources and copied to the original sandbox tenant. Some records may be removed from the original sandbox tenant before, as they may include sensitive information (e.g., data that should not provided outside of an organization, such as to external developers).

In some implementations, validation testing may be performed on the original sandbox tenant before generating one or more new sandbox tenants to be used by developers. For example, the code and test data of the original tenant sandbox may be deployed, and the system 100 shown in FIGS. 3A-3B, the server 502 and/or server 504 shown in FIG. 4A, the central component 700 and/or the second computer 800 shown in FIG. 5, and/or database systems 1200a-1200d shown in FIG. 6 may perform verification testing of the deployed code and test data. When the verification testing is complete, the original sandbox tenant may be ready to be duplicated using the template into one or more new sandbox tenants using the extent reference, keys, and virtualization as described throughout.

The method 10b may be used in connection with the systems shown in FIGS. 3A-6, as described in detail below. The original sandbox tenant may have original sandbox tenant data stored in an immutable storage (e.g., the physical storage shown in FIGS. 3A-3B, storage 810 of second computer 800 shown in FIG. 5, database systems 1200a-d of FIG. 6, and the like) associated with a tenant identifier. In the method 10b, the at least one new sandbox tenant data as of the creation point in time of the at least one new sandbox may be a virtual snapshot of the original sandbox tenant data and be accessible to the at least one new sandbox tenant. The at least one new sandbox tenant data can be changed without changing the original sandbox tenant data, and the original sandbox tenant data can be changed without changing the sandbox tenant data. When there are a plurality of new sandbox tenants, the data of each of the new sandbox tenants may be changed without affecting the other new sandbox tenants or the original sandbox tenant. The snapshot may be virtual in that both the original sandbox tenant and the at least one new sandbox tenant use the same immutable data for data (or versions of data that existed as of the creation of the at least one new sandbox).

At least one new sandbox tenant identifier may be created at operation 12b. The at least one new sandbox tenant identifier may be created by a database system, such as a server, cloud server, and/or database, or the like. For example, the at least one new sandbox tenant identified may be created by the system 100 shown in FIGS. 3A-3B, the server 502 and/or server 504 shown in FIG. 4A, the central component 700 and/or the second computer 800 shown in FIG. 5, and/or database systems 1200a-1200d shown in FIG. 6.

At operation 14b, the database system may create at least one new sandbox tenant by associating the at least one new sandbox tenant identifier with the virtual snapshot of the original sandbox tenant data. The at least one new sandbox tenant may be associated with one or more authorized users of the database system, such as one or more developers. The at least one new sandbox tenant identifier may be associated with the at least one new sandbox data created by the at least one new sandbox tenant subsequent to the creation point in time of the at least one new sandbox. The at least one new sandbox data created by the at least one new sandbox tenant subsequent to the creation point in time of the at least one new sandbox may be inaccessible to the original sandbox tenant and/or any of the other new sandbox tenants.

At operation 16b, subsequent to the sandbox creation point in time, the database system may create subsequent original tenant data associated with the original tenant identifier stored in the immutable storage (e.g., the physical storage shown in FIGS. 3A-3B, storage 810 of second computer 800 shown in FIG. 5, database systems 1200a-d of FIG. 6, and the like). The subsequent original sandbox tenant data may be created by the database system by an authorized user that is associated with the original sandbox tenant. For example, one or more applications controlled by the authorized user associated with the original sandbox tenant may perform one or more operations that create the subsequent original sandbox tenant data. The subsequent immutable original sandbox tenant data may not be accessible to the at least one new sandbox tenant. The original sandbox tenant may access original sandbox tenant data created both before and after the creation point in time of the at least one new sandbox that is stored in the immutable storage. The subsequent immutable original sandbox tenant data is written as new original tenant data that does not alter older original sandbox tenant data (e.g., the original sandbox tenant data and the at least one new sandbox tenant data) stored in the immutable storage and the original sandbox tenant cannot access the data that is created or augmented by the at least one new sandbox tenant.

FIG. 2A1 shows an example method 20 of receiving a query and operating on data from the immutable storage by dynamic mapping a tenant identifier according to an implementation of the disclosed subject matter. In some implementations, the method 20 may be used in connection with the method 10a described above and shown in FIG. 1A. At operation 21, the database system may receive a query including a key indicating the sandbox tenant. The database system may be a server, cloud server, and/or database, or the like. For example, the database system that receives a query may be system 100 shown in FIGS. 3A-3B, server 502 and/or server 504 shown in FIG. 4A, central component 700 and/or a second computer 800 shown in FIG. 5, and/or database systems 1200a-1200d shown in FIG. 6. The query may be generated, by for example, computer 600 shown in FIG. 5.

At operation 22, the database system may operate on data from the immutable storage identified by the key for the sandbox tenant by dynamically mapping a primary key indicating the sandbox tenant to a primary key indicating the original tenant if the primary key identifies a transaction that is part of the virtual sandbox, i.e., the contents of the record being sought was created before the sandbox was created. The immutable storage may be the storage shown in FIGS. 3A-3B, the storage 810 of second computer 800 shown in FIG. 5, database systems 1200a-d of FIG. 6, and the like.

FIG. 2A2 shows an example method 20a of receiving a query and operating on data from the immutable storage by dynamic mapping a tenant identifier of the at least one new sandbox according to an implementation of the disclosed subject matter. In some implementations, the method 20a may be used in connection with the method 10b described above and shown in FIG. 1B. At operation 21a, the database system may receive a query including a key indicating the at least one new sandbox tenant.

At operation 22a, the database system may operate on data from the immutable storage identified by the key for the at least one new sandbox tenant by dynamically mapping a primary key indicating the at least one new sandbox tenant to a primary key indicating the original sandbox tenant if the primary key identifies a transaction that is part of the virtual sandbox, i.e., the contents of the record being sought was created before the at least one new sandbox was created.

FIG. 2B1 shows an example method of retrieving and translating data from the immutable storage by translating the keys for the data from the immutable storage indicated by the key of the original tenant to a key indicating the sandbox tenant, and performing an operation on the translated data according to an implementation of the disclosed subject matter. In particular, FIG. 2B1 shows the example operations that may be part of operation 22 of method 20 shown in FIG. 2A1 and described above. At operation 24, as shown in FIG. 2B1, the database system may retrieve data from the immutable storage based on the mapped key. As described above, the database system may be may be system 100 shown in FIGS. 3A-3B, server 502 and/or server 504 shown in FIG. 4A, central component 700 and/or a second computer 800 shown in FIG. 5, and/or database systems 1200a-1200d shown in FIG. 6, and the immutable storage may be the physical storage shown in FIGS. 3A-3B, storage 810 of second computer 800 shown in FIG. 5, database systems 1200a-d of FIG. 6, and the like.

At operation 26, the database system may translate the keys for the data from the immutable storage indicated by the key of the original tenant to a key indicating the sandbox tenant. For this translation operation, the data remains in the immutable storage and is not duplicated, but the data is associated with the sandbox tenant. That is, the keys of the original tenant are mapped to the keys of the sandbox tenant so that the sandbox tenant may access the data created before the creation of the sandbox may be accessible to users of the sandbox. However, keys for data created by the sandbox tenant are not translated and may point to data in extents that are only accessible to the sandbox tenant and are not available to the original tenant.

The database system may perform an operation on the translated data at operation 28, and may store data resulting from the performed operation in the immutable storage that is associated with the key of the sandbox tenant at operation 30. The database system may, in some implementations, store the data in the immutable storage using a LSM tree data structure. Operations on the data associated with the sandbox may include, for example, the manipulation of the data based on one or more functions of the application being tested. That is, the data may be manipulated based on the version of the application being tested and/or a new function that has been added to the application to be tested. However, modifications to that data being tested are not accessible to users associated only with the original tenant. The manipulated data is associated with the key of the sandbox tenant, and stored in the immutable storage. In some implementations, the example method 20 shown in FIG. 2A1 may include returning the data from the immutable storage for the sandbox tenant based on the dynamic mapping of the key indicating the sandbox tenant.

In performing the method 20 of FIG. 2A1, the database system may, in some implementations, receive a query including a key indicating the sandbox tenant and may operate on data from the immutable storage identified by the key for the sandbox tenant. The query may be received from an authorized user of the database system that is associated with the sandbox tenant. The data may be returned from the immutable storage for the sandbox tenant based on the dynamic mapping of the key indicating the sandbox tenant.

In some implementations, the database system used in connection with the method 10a may receive an operation to delete the sandbox tenant. For example, an authorized user associated with the sandbox tenant may provide a delete request to the database system. Upon receipt of the request, the database system may remove, from the immutable storage, at least one key associated with the sandbox tenant without changing the original tenant data. The removing the at least one key may be performed by removing a key range from the immutable storage without removing physical data stored in the immutable storage. That is, references to the immutable storage for one or more keys of the key range may be removed, but the data previously associated with the removed references may be retained in the immutable storage if there are also keys for that data for the original tenant.

When performing an operation to delete a sandbox tenant, removing at least one key associated with the sandbox tenant may include removing extent references from the immutable storage for the sandbox tenant data that have original tenant key mappings associated with them. This deletion operation may be performed on the sandbox tenant when there have been no changes to the sandbox tenant data in the immutable storage after the sandbox creation point in time.

In another implementation of performing an operation to delete a sandbox tenant, the removing the at least one key by the database system may include removing extent references from the immutable storage for a key range of the sandbox tenant data. In contrast to the implementation described above, this deletion operation may be performed when there have been changes to the sandbox tenant data in the immutable storage. This operation may be to replace existing extent references of the original tenant data so as to not include the removed extent references of the sandbox tenant data.

FIG. 2B2 shows an example method of retrieving and translating data from the immutable storage by translating the keys for the data from the immutable storage indicated by the key of the original sandbox tenant to a key indicating the at least one new sandbox tenant, and performing an operation on the translated data according to an implementation of the disclosed subject matter. The operations shown in operation 22a of FIG. 2B2 may be part of method 20a shown in FIG. 2A2 and described above. As shown in FIG. 2B2, the database system may retrieve data from the immutable storage based on the mapped key at operation 24a.

At operation 26a, the database system may translate the keys for the data from the immutable storage indicated by the key of the original sandbox tenant to a key indicating the at least one new sandbox tenant. For this translation operation, the data remains in the immutable storage and is not duplicated, but the data is associated with the at least one new sandbox tenant. That is, the keys of the original sandbox tenant are mapped to the keys of the at least one new sandbox tenant. However, keys for data created by the at least one new sandbox tenant are not translated and may point to data in extents that are only accessible to the at least one new sandbox tenant and are not available to the original sandbox tenant.

The database system may perform an operation on the translated data at operation 28a, and may store data resulting from the performed operation in the immutable storage that is associated with the key of the at least one sandbox tenant at operation 30a. In some implementations, the database system may store the data in the immutable storage using a LSM tree data structure. Operations on the data associated with the sandbox may include, for example, the manipulation of the data based on one or more functions of the application being tested. That is, the data may be manipulated based on the version of the application being tested and/or a new function that has been added to the application to be tested. However, modifications to that data being tested are not accessible to users associated only with the original sandbox tenant or other new sandbox tenants, if there is more than one new sandbox tenant. The manipulated data is associated with the key of the at least one new sandbox tenant, and stored in the immutable storage. In some implementations, the method 20a shown in FIG. 2A2 may include returning the data from the immutable storage for the sandbox tenant based on the dynamic mapping of the key indicating the sandbox tenant.

In some implementations, the database system may receive a query including a key indicating the at least one new sandbox tenant and may operate on data from the immutable storage identified by the key for the at least one new sandbox tenant. The query may be received from an authorized user of the database system that is associated with the at least one new sandbox tenant. The data may be returned from the immutable storage for the at least one new sandbox tenant based on the dynamic mapping of the key indicating the at least one new sandbox tenant.

In some implementations, the database system used in connection with the method 10b may receive an operation to delete the at least one new sandbox tenant. For example, an authorized user associated with the new sandbox tenant may provide a delete request to the database system. Upon receipt of the request, the database system may remove, from the immutable storage, at least one key associated with the new sandbox tenant without changing the original sandbox tenant data or other new sandbox tenant data. The removing the at least one key may be performed by removing a key range from the immutable storage without removing physical data stored in the immutable storage. That is, references to the immutable storage for one or more keys of the key range may be removed, but the data previously associated with the removed references may be retained in the immutable storage if there are also keys for that data for the original sandbox tenant.

When performing an operation to delete a new sandbox tenant, removing at least one key associated with the new sandbox tenant may include removing extent references from the immutable storage for the sandbox tenant data that have original sandbox tenant key mappings associated with them. This deletion operation may be performed on the new sandbox tenant when there have been no changes to the new sandbox tenant data in the immutable storage after the sandbox creation point in time.

In another implementation of performing an operation to delete a new sandbox tenant, the removing the at least one key by the database system may include removing extent references from the immutable storage for a key range of the new sandbox tenant data. In contrast to the implementation described above, this deletion operation may be performed when there have been changes to the new sandbox tenant data in the immutable storage. This operation may be to replace existing extent references of the original sandbox tenant data so as to not include the removed extent references of the new sandbox tenant data.

FIG. 3A shows an example system and method of storing and retrieving data using a virtualization layer according to an implementation of the disclosed subject matter. The system 100 may be a single computing device, or may include multiple connected computing devices, and may be, for example, a laptop, a desktop, an individual server, a server cluster, a server farm, or a distributed server system, or may be a virtual computing device or system, or any suitable combination of physical and virtual systems. For simplicity, components such as the processor, short and long term storage, the operating system, much of the database management system are not shown. The server system 100 may be part of a computing system and network infrastructure, or may be otherwise connected to the computing system and network infrastructure, including a larger server network which may include other server systems similar to the server system 100. In some implementations, the system 100 may be the computer 600, central component 700, and or the second computer 800 shown in FIG. 5, and/or one or more of the database systems 1200a-1200d shown in FIG. 6.

The system 100 may store transactions as immutable versions of given records. Immutable versions of contents of records already stored on the server system may be unchanged until the contents are deleted (if ever) from the server system. That is, a received transaction may create a new version of the contents of the record to be stored in the server system, instead of altering the contents of the record. Thus, it may be possible for multiple versions of a record (e.g., records having different contents) as disclosed herein to have identical keys. The use of identical keys for versions of a given record may allow for the changing of data stored in the relational database. As such, each version of the physical record may be immutable; i.e., it is either not deleted or is not deleted over an arbitrarily long period of time that may be months, years or decades. For example, a later version of a record with an identical key to an earlier version of the record may indicate a change in the data value for that record (i.e., the change in contents of the record). Alternatively, a transaction may create a record or delete a record (i.e., create contents or delete contents), but the deletion of the record may not remove the transactions.

An access layer 105 of the system 100 may have a database storage engine 110, which may accept a query for the database system (e.g., central component 700 shown in FIG. 5 and/or database systems 1200a-1200d shown in FIG. 6) from a computing device (e.g., computer 600 and/or a second computer 800 shown in FIG. 5). For example, the database storage engine 110 may receive a query for an organization within a first namespace of data within a database system. The first namespace may be an original tenant and/or an original sandbox tenant. The database storage engine 110 may be any suitable combination of hardware and software on the server system 100 for receiving queries for the database system, and retrieving data related to the received query.

The system 100 may include a virtualization layer 115, which may have an extent reference 120. In some implementations, the extent reference 120 may be part of the central component 700 shown in FIG. 5 and/or database systems 1200a-1200d shown in FIG. 6. The extent reference 120 may be any suitable combination of hardware and software on the server system 100 to perform as the virtualization layer 115 between the database storage engine 110 and physical storage 127 (e.g., where extents may be stored as part of extent 130, as described below). The physical storage 127 may be semiconductor memory, a solid state drive (SSD), hard disk drive, optical memory, an optical storage device, or any other suitable physical data storage medium, or some combination thereof.

As shown in FIG. 3A, the extent reference 120 may be for a first namespace. The extent reference 120 may receive a query from the database storage engine 110 via the virtualization layer 115 to find data. The query may be received from an authorized user of the database system that is associated with at least one tenant. The virtualization layer 115 may interpret the query so as to locate the requested data of the query in the physical storage 127 of the system 100 which may store extents. That is, the virtualization layer 115 may retrieve the data requested by the query from the extent 130, and may return the data to the database storage engine 110 which may provide it to the computing device which may the query of the database system.

FIG. 3B shows retrieving data from the sandbox of a database system by translating the keys for the data according to an implementation of the disclosed subject matter. The system 100 of FIG. 3B may be similar to that shown in FIG. 3A, but FIG. 3B may include extent reference 125 as part of the virtualization layer 115, as described in detail below.

A sandbox may be created for a first (original) tenant (i.e., a first namespace). The first namespace may be an original tenant or an original sandbox tenant. For example, an authorized user of the database system that is associated with at least the first (original) tenant may issue a command to the database system to create the sandbox (i.e., the second namespace). The second namespace may be a sandbox of the original tenant or at least one new sandbox tenant of the original sandbox tenant. That is, by using the data of the first namespace, a second namespace may be created, which may form the extent reference 125. The data of both the first and second namespaces may be stored in the physical storage 127 of system 100. The first and second namespaces may refer entirely or partly to the same stored data. When there are a plurality of new sandbox tenants that are duplicates of the original sandbox tenant, each of the new sandbox tenants may have a different namespace and extent references.

After the sandbox is created in the example shown in FIG. 3B, the database storage engine 110 may receive a query from the authorized user for data associated with the second namespace. The extent reference 125, which may be for the second namespace, may receive the query for the data associated with the second namespace. In the example, although the sandbox has been created for the second namespace, the data stored in the physical storage 127 is the same data. Thus, the virtualization layer 115 may find the data for the first namespace in the extent 130 based on the query received from the authorized user of the database system. The data returned to the extent reference 125 is data for the first namespace. The virtualization layer 115 may translate the first namespace data into second namespace data by mapping keys from the first namespace to keys in the second namespace. As shown in FIG. 3B, the translated second namespace data may be provided to the database storage engine 110 from the extent reference 125 via the virtualization layer 115. The database storage engine 110 may return the second namespace data to the computing device of the authorized database user from which the query was received.

In the examples shown in FIGS. 3A-3B, extent references may be used to determine whether to retrieve pre-sandbox data or post-sandbox data in response to a query, when a sandbox is made from an original tenant. As disclosed throughout, the virtual snapshot is a collection of extent references. Data created prior to the sandbox may have extent references that point to extents with the original tenant data. New sandbox data (i.e., subsequent sandbox tenant data that is created after the creation of the sandbox) may be associated with an extent reference that points to an extent which includes the sandbox keys (i.e., the key range of the sandbox). Sandbox tenant data (i.e., data associated with a sandbox at the creation of the sandbox) may be associated with extent references that indicate that they contain the sandbox key range. The extent references for the sandbox tenant data may point to an extent which has the original keys (i.e., keys to original tenant data that existed at the time of the creation of the sandbox), as well as additional translation information.

For example, as shown in FIG. 3A, a query may be received by the access layer 105. The access layer 105 may determine that the query is for a first namespace for an organization (i.e., for original tenant data associated with an original tenant) based on a predicate in the query. In the example of FIG. 3A, it is assumed that queries on behalf of the tenant include a predicate specifying the tenant. The predicate indicating the tenant may be explicit, where the predicate may be included before the query retrieves information from the database (e.g., database 1200*a*, 1200*b*, 1200*c*, and/or 1200*d* shown in FIG. 6), or the predicate may be implicit in the way in which a connection is established with a database. If the query is in the key range of the original tenant data (as shown in FIG. 3A) based on the extent references that point to the extents with the original tenant data, the access layer 105 may request that the virtualization layer 115 retrieve data requested by the query from the physical storage 127. To retrieve the data, the extent reference 120 of the virtualization layer 115 may point to the extent 130 in the physical storage 127. As described above in connection with FIG. 3A, the data stored in the physical storage 127 may be retrieved based on the extent pointed to, and provided in response to the query.

If the predicate in the query is associated with the key range of the sandbox (e.g., the second namespace), as shown in the example of FIG. 3B, the access layer 105 may request that the virtualization layer 115 retrieve the data requested by the query from the physical storage 127 based on a determination that the predicate in the query is associated with the second namespace (i.e., the data associated with the sandbox tenant). The extent reference 125, which includes the predicate in the query (i.e., for the sandbox key range), may point to the extent 130 in the physical storage 127, which has the original keys (e.g., for the data for the first namespace). The returned data of the first namespace from the extent 130 is translated by using the translation information included with the extent reference 125. That is, the returned data for the first namespace may be translated to second namespace data with the translation information included with the extent reference 125. The data for the second namespace (e.g., data that is associated with the extent reference 125) may be returned to the access layer 105 in response to the query received by the access layer 105, as described in detail above in connection with FIG. 3B. FIGS. 3A-3B may also show extent references being used to determine whether to retrieve data that was created before the creation of the at least one new sandbox (from the original sandbox) or after the creation of the at least one new sandbox. As disclosed throughout, the virtual snapshot is a collection of extent references. Data created prior to the creation of the at least one new sandbox may have extent references that point to extents with the original sandbox tenant data. New data for the at least one new sandbox (i.e., subsequent new sandbox tenant data that is created after the creation of the at least one new sandbox) may be associated with an extent reference that points to an extent which includes the new sandbox keys (i.e., the key range of the at least one sandbox). New sandbox tenant data (i.e., data associated with the at least one new sandbox at the creation of the at least one new sandbox) may be associated with extent references that indicate that they contain the at least one new sandbox key range. The extent references for the at least one new sandbox tenant data may point to an extent which has the original keys (i.e., keys to original sandbox tenant data that existed at the time of the creation of the at least one sandbox), as well as additional translation information.

FIG. 3A shows that a query may be received by the access layer 105. The access layer 105 may determine that the query is for a first namespace for an organization (i.e., for original sandbox tenant data associated with an original sandbox tenant) based on a predicate in the query. It is assumed that queries on behalf of the tenant include a predicate specifying the tenant. If the query is in the key range of the original sandbox tenant data based on the extent references that point to the extents with the original sandbox tenant data, the access layer 105 may request that the virtualization layer 115 retrieve data requested by the query from the physical storage 127. To retrieve the data, the extent reference 120 of the virtualization layer 115 may point to the extent 130 in the physical storage 127. As described above in connection with FIG. 3A, the data stored in the physical storage 127 may be retrieved based on the extent pointed to, and provided in response to the query.

As shown in FIG. 3B, if the predicate in the query is associated with the key range of the at least one sandbox (e.g., the second namespace), the access layer 105 may request that the virtualization layer 115 retrieve the data requested by the query from the physical storage 127 based on a determination that the predicate in the query is associated with the second namespace (i.e., the data associated with the at least one new sandbox tenant). The extent reference 125, which includes the predicate in the query (i.e., for the at least one new sandbox key range), may point to the extent 130 in the physical storage 127, which has the original keys (e.g., for the data for the first namespace). The returned data of the first namespace from the extent 130 is translated by using the translation information included with the extent reference 125. That is, the returned data for the first namespace (i.e., the original sandbox tenant) may be translated to second namespace data (i.e., the data for the at least one new sandbox tenant) with the translation information included with the extent reference 125. The data for the second namespace (e.g., data that is associated with the extent reference 125) may be returned to the access layer 105 in response to the query received by the access layer 105.

Figure 4A:
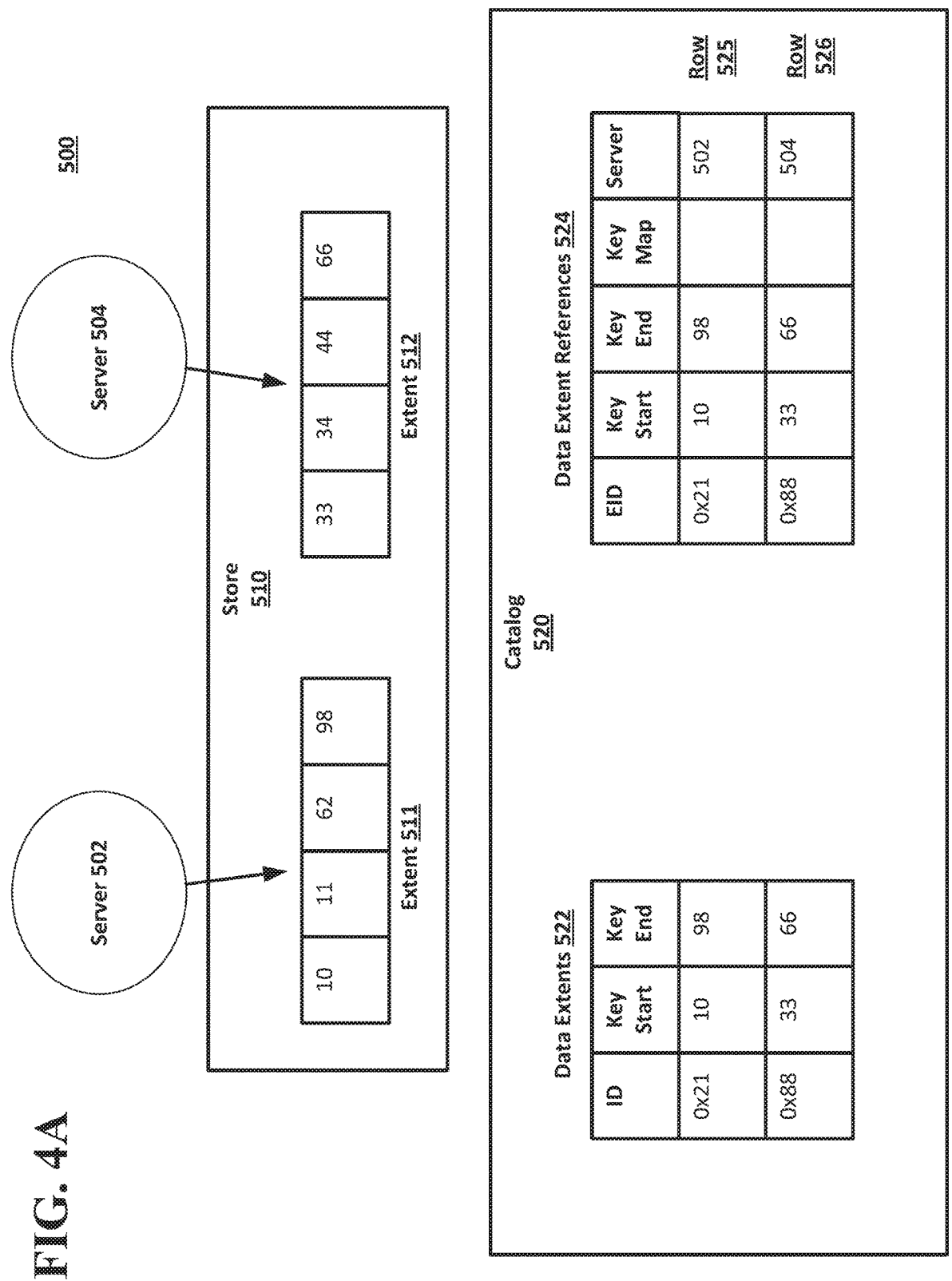
FIGS. 4A-4B show an example of a system architecture that may be used in connection with a sandbox according to an implementation of the disclosed subject matter.
Figure 4B:
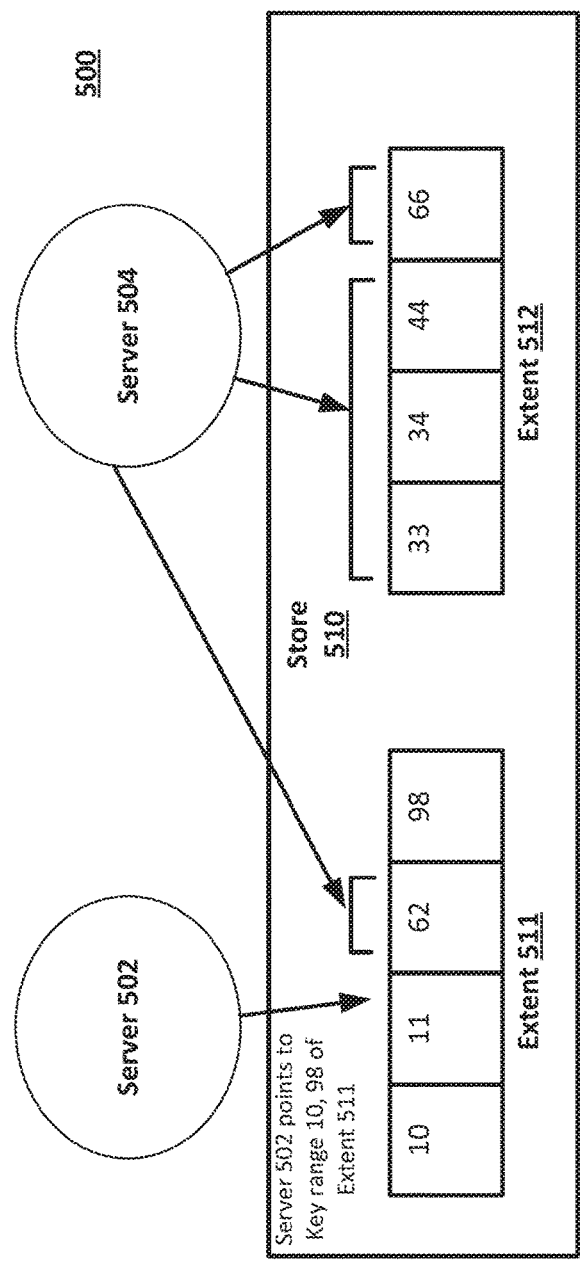

FIGS. 4A-4B show an example of a system 500 that may be used in connection with forming a sandbox according to an implementation of the disclosed subject matter. In particular, FIGS. 4A-4B show a remapping of a tenant with multiple keys according to an implementation of the disclosed subject matter. The system 500 may be a database system, server system, cloud server system, or the like. The system 500 may include server 502, server 504, store 510, and catalog 520. The servers 502, 504 may have the same persistence, or may have different a different persistence from one another. The store 510, which may be shared by the servers 502 and 504, may be any suitable combination of hardware and software on the system 500 for storing key ranges for data in extents associated with the server 502 and/or the server 504. The store 510 may include extent 511, which may be associated with server 502, and extent 512, which may be associated with server 504. The catalog 520 may be may be any suitable combination of hardware and software on the system 500 for storing data extents and data extent references.

In the example shown in FIG. 4A, server 502 may be associated with the extent 511 in store 510, the extent 511 having tenant IDs of 10, 11, 62, and 98, where each tenant ID number has a key that starts with the tenant ID number. For example, the tenant ID of 62 may have multiple keys in a key range, where the keys all start with 62. That is, in this example, 62 may be the leading portion of a key, with a complete key being made of different components, and may be the tenant ID. The server 504 may be associated extent 512, having tenant IDs 33, 34, 44, and 66, where each tenant ID number has a key that starts with the tenant ID number. That is, the extent 511 associated with the server 502 may have a key range of key ([first key], [last key]) of key (10, 98), and the extent 512 associated with the second server 504 may have a key range of key (33, 66).

In the catalog 520, data extents 522 may map to the data extents 511 and 512 for the servers 502 and 504. For example, in the data extents 522, the ID for the extent 511 may be 0x21, and the key start may be 10 (i.e., which matches that of the extent 511 in the store 510), and the key end may be 98 (i.e., which matches that of the extent 511 in the store 510). Similarly, the ID for the extent 512 for the server 504 in the data extents 522 may be 0x88, the key start may be 33 (i.e., which matches that of the extent 512 in the store 510), and the key end may be 66 (i.e., which matches that of the extent 512 in the store 510. Data extent references 524 may be references to the data extents (e.g., data extents 522), and may include information about an associated server (e.g., server 502 or 504). Row 525 of the data extent references 524 may include similar information for ID 0x21 of the data extents 522, but may include the EID (extent ID) as 0x21, and may indicate that the server having the key start of 10 and the key end of 98 is server 502.

In the example shown in FIG. 4A, the data extent references 524 show a state of the extents prior to having tenant ID 62 of the extent 511 associated with the server 502 be sandboxed as tenant ID 63. To map the tenant ID 62 of the extent 511 associated with the server 502 to the tenant ID 63 to be added, the data extent references 524 may reflect the changes to server 504. In particular, as shown in FIG. 4B in rows 526 and 528, the extent 512 (i.e., the extent having EID for 0x88) may be split into two key ranges. The data extent references 524 may be updated so that the extent of row 526 (i.e., the extent 512) may have a key start of 33 and a key end of 44 (i.e., a key range of (33, 44), and the extent of row 528 (i.e., the extent 512) may have a key start of 66 and a key end of 66 (i.e., a key range of (66, 66)). That is, key range 33-44 of the extent 512 is in a first segment, and the key range starting and ending with key 66 is a second segment. As shown in FIG. 4B, the server 504 may point to the key range of (33, 44), as well as point to the key range of (66, 66), in extent 512.

As shown in FIG. 4B, a row 527 may be inserted between row 526 and row 528 of the data extent reference 524. Row 527 may have the extent 511 (i.e., the extent having the extent ID of 0x21, much like row 525 for server 502), and may have a key start of 63 and a key end of 63, and may indicate the mapping of the tenant ID 62 to the tenant ID 63. The data extent reference 524 may include the key range (10, 98) associated with the server 502, and the key ranges (33, 44), (63, 63), and (66, 66) associated with the server 504. That is, FIG. 4A may show the state of the data extent references 524 before the mapping of tenant 62 to tenant 63, and FIG. 4B may show the state of the data extent references after the mapping. As shown in FIG. 4B, the server 504 may point to the key range of (33, 44) and the key range (66, 66) of the extent 512, as well as the key range (62, 62) of the extent 511.

Implementations of the presently disclosed subject matter may be implemented in and used with a variety of component and network architectures. FIG. 5 is an example computer 600 suitable for implementing implementations of the presently disclosed subject matter. As discussed in further detail herein, the computer 600 may be a single computer in a network of multiple computers. As shown in FIG. 5, the computer 600 may communicate with a central or distributed component 700 (e.g., server, cloud server, database, cluster, application server, etc.). The central component 700 may communicate with one or more other computers such as the second computer 800, which may include a storage device 810. The second computer 800 may be a server, cloud server, or the like. The storage 810 may use any suitable combination of any suitable volatile and non-volatile physical storage mediums, including, for example, hard disk drives, solid state drives, optical media, flash memory, tape drives, registers, and random access memory, or the like, or any combination thereof.

Data may be stored in any suitable format in, for example, the storage 810, using any suitable filesystem or storage scheme or hierarchy. For example, the storage 810 may store data using a log structured merge (LSM) tree with multiple levels. Further, if the systems shown in FIGS. 5-6 are multitenant systems, the storage may be organized into separate log structured merge trees for each instance of a database for a tenant. Alternatively, contents of all records on a particular server or system may be stored within a single log structured merge tree, in which case unique tenant identifiers associated with versions of records may be used to distinguish between data for each tenant as disclosed herein. More recent transactions may be stored at the highest or top level of the tree and older transactions may be stored at lower levels of the tree. Alternatively, the most recent transaction or version for each record (i.e., contents of each record) may be stored at the highest level of the tree and prior versions or prior transactions at lower levels of the tree.

The information obtained to and/or from a central component 700 may be isolated for each computer such that computer 600 may not share information with computer 800. Alternatively or in addition, computer 600 may communicate directly with the second computer 800.

The computer (e.g., user computer, enterprise computer, etc.) 600 includes a bus 610 which interconnects major components of the computer 600, such as a central processor 640, a memory 670 (typically RAM, but which may also include ROM, flash RAM, or the like), an input/output controller 680, a user display 620, such as a display or touch screen via a display adapter, a user input interface 660, which may include one or more controllers and associated user input or devices such as a keyboard, mouse, WiFi/cellular radios, touchscreen, microphone/speakers and the like, and may be closely coupled to the I/O controller 680, fixed storage 630, such as a hard drive, flash storage, Fibre Channel network, SAN device, SCSI device, and the like, and a removable media component 650 operative to control and receive an optical disk, flash drive, and the like.

The bus 610 enable data communication between the central processor 640 and the memory 670, which may include read-only memory (ROM) or flash memory (neither shown), and random access memory (RAM) (not shown), as previously noted. The RAM can include the main memory into which the operating system and application programs are loaded. The ROM or flash memory can contain, among other code, the Basic Input-Output system (BIOS) which controls basic hardware operation such as the interaction with peripheral components. Applications resident with the computer 600 can be stored on and accessed via a computer readable medium, such as a hard disk drive (e.g., fixed storage 630), an optical drive, floppy disk, or other storage medium 650.

The fixed storage 630 may be integral with the computer 600 or may be separate and accessed through other interfaces. A network interface 690 may provide a direct connection to a remote server via a telephone link, to the Internet via an internet service provider (ISP), or a direct connection to a remote server via a direct network link to the Internet via a POP (point of presence) or other technique. The network interface 690 may provide such connection using wireless techniques, including digital cellular telephone connection, Cellular Digital Packet Data (CDPD) connection, digital satellite data connection or the like. For example, the network interface 690 may enable the computer to communicate with other computers via one or more local, wide-area, or other networks, as shown in FIG. 6.

Many other devices or components (not shown) may be connected in a similar manner (e.g., data cache systems, application servers, communication network switches, firewall devices, authentication and/or authorization servers, computer and/or network security systems, and the like). Conversely, all of the components shown in FIG. 6 need not be present to practice the present disclosure. The components can be interconnected in different ways from that shown. The operation of a computer such as that shown in FIGS. 5-6 is readily known in the art and is not discussed in detail in this application. Code to implement the present disclosure can be stored in computer-readable storage media such as one or more of the memory 670, fixed storage 630, removable media 650, or on a remote storage location.

FIG. 6 shows an example network arrangement according to an implementation of the disclosed subject matter. Four separate database systems 1200*a-d* at different nodes in the network represented by cloud 1202 communicate with each other through networking links 1204 and with users (not shown). Each of database systems 1200 may be operable to host multiple instances of a database, where each instance is accessible only to users associated with a particular tenant. Each of the database systems may constitute a cluster of computers along with a storage area network (not shown), load balancers and backup servers along with firewalls, other security systems, and authentication systems. Some of the instances at any of systems 1200 may be live or production instances processing and committing transactions received from users or from computing elements (not shown) for ingesting and providing data for storage in the instances.

One or more of the database systems 1200*a*-1200*d* may create a sandbox for an original tenant at any time. For example, one or more authorized users of the database systems 1200*a*-1200*d* that are associated with the original tenant may request that a sandbox be created by one of the database systems 1200*a*-1200*d*. The system, for example 1200*c*, may include at least one storage device, such as in FIG. 6. For example, the storage may include memory 670, fixed storage 630, removable media 650, a storage device included with the central component 700 and/or the second computer 800, and/or one or more storage devices associated with one or more of the database systems 1200*a*-1200*d*. The original tenant may have original tenant data stored in an immutable storage of the at least one storage device associated with an original tenant identifier. The original tenant data as of the sandbox creation point in time may be used to create a virtual snapshot of the original tenant data accessible by a sandbox tenant. The new or updated sandbox tenant data can be stored in the storage device or elsewhere (e.g., such as a cache storage system, networked storage device, or the like) and can be changed without changing the original tenant data that existed as of the time of the creation of the sandbox, and the original tenant data can be changed or updated without changing the sandbox tenant data. Further, neither the sandbox tenant nor the original tenant may alter the data in the virtual snapshot as subsequent updates for the sandbox tenant and the original tenant may be stored separately in different portions of the LSM storage. The virtual snapshot may be created by noting a time stamp or other time identifier as of the creation of the sandbox tenant. Thereafter, both the sandbox tenant and original tenant will interpret primary key requests for versions of the data before the time stamp by accessing the appropriate version based on the key in the pool of the data stored before the time stamp. Keys for the respective tenants accessing data created or updated after the time stamp will be interpreted to access the appropriate data created by only the sandbox tenant or the original tenant. Alternatively, rather than using time stamps, each transaction in the database may have a unique transaction number associated with it that is monotonically increasing for each subsequent transaction and the system may note the most recently created transaction identifier in lieu of the time stamp.

Similarly, the sandbox tenant may have original sandbox tenant data stored in the immutable storage of the at least one storage device associated with an original sandbox tenant identifier. The original sandbox tenant data as of the creation point in time of the at least one new sandbox tenant may be used to create a virtual snapshot of the original sandbox tenant data accessible by the at least one new sandbox tenant. The new or updated data of the at least one new sandbox tenant can be stored in the storage device or elsewhere (e.g., such as a cache storage system, networked storage device, or the like) and can be changed without changing the original sandbox tenant data that existed as of the time of the creation of the at least one new sandbox, and the original sandbox tenant data can be changed or updated without changing the at least one new sandbox tenant data. Neither the at least one new sandbox tenant nor the original sandbox tenant may alter the data in the virtual snapshot as subsequent updates for the at least one new sandbox tenant and the original sandbox tenant may be stored separately in different portions of the LSM storage.

In this example, the virtual snapshot may be created by noting a time stamp or other time identifier as of the creation of the at least one new sandbox tenant. Thereafter, both the at least one new sandbox tenant and original sandbox tenant will interpret primary key requests for versions of the data before the time stamp by accessing the appropriate version based on the key in the pool of the data stored before the time stamp. Keys for the respective tenants accessing data created or updated after the time stamp will be interpreted to access the appropriate data created by only the at least one new sandbox tenant or the original sandbox tenant. Alternatively, rather than using time stamps, each transaction in the database may have a unique transaction number associated with it that is monotonically increasing for each subsequent transaction and the system may note the most recently created transaction identifier in lieu of the time stamp.

The one or more servers, such as those shown in FIGS. 5-6, may create a sandbox tenant identifier, and may create the sandbox tenant by associating the sandbox tenant identifier with the virtual snapshot of the original tenant data and with sandbox data created by the sandbox tenant subsequent to the sandbox creation point in time. The sandbox data created by the sandbox tenant subsequent to the sandbox creation point in time may be inaccessible to the original tenant. Subsequent to the sandbox creation point in time, the systems shown in FIGS. 5-6 may create subsequent original tenant data associated with the original tenant identifier stored in the immutable storage of the storage device. This subsequent original tenant data may not be accessible to the sandbox tenant. The original tenant may access original tenant data created both before and after the sandbox creation point in time that is stored in the immutable storage, and the subsequent sandbox tenant data may be created as new tenant data that does not alter other tenant data stored in the immutable storage.

The one or more servers of the systems shown in FIGS. 5-6 may receive a query including a key indicating the sandbox tenant operating on data from the immutable storage identified by the key for the sandbox tenant by dynamically mapping the key indicating the sandbox tenant to a key indicating the original tenant. For example, the keys may include a time stamp or sequence indicator as described above. For the sandbox tenant, the time stamp or sequence indicator may be examined by the database system to determine if the time stamp or sequence identifier indicates that the sandbox tenant is seeking to access data created before the creation of the sandbox tenant. In that case, the key is dynamically mapped to the appropriate data that may be accessed by both the original tenant and the sandbox tenant. On the other hand, if the time stamp or sequence identifier in the request indicates that the data was created or updated after the creation of the tenant, the request is not so mapped and instead accesses the appropriate transaction that is only accessible to the sandbox tenant. The one or more servers of the systems shown in FIGS. 5-6 may receive the data from the immutable storage for the sandbox tenant from the at least one storage device (e.g., the storage device associated with central component 700, the second computer 800, and/or the database systems 1200a-1200d) based on the dynamic mapping of the key indicating the sandbox tenant.

The one or more servers of the systems shown in FIGS. 5-6 may operate on data so as to retrieve data from the immutable storage based on the mapped key. The servers may translate the data from the immutable storage indicated by the key of the original tenant to data of the key indicating the sandbox tenant and perform an operation on the translated data. The data resulting from the performed operation may be in the immutable storage of a device that is associated with the key of the sandbox tenant, such as the storage device associated with central component 700, second computer 800, and/or one or more of the database systems 1200a-1200d.

The one or more servers of the systems shown in FIGS. 5-6 may receive a query (e.g., from computer 600 shown in FIG. 5, or the like) including a key indicating the original tenant, and may operate on data from the immutable storage of the at least one storage device identified by the key for the original tenant. The one or more servers receives the data from the immutable storage from the at least one storage device for the sandbox tenant based on the dynamic mapping of the key indicating the sandbox tenant.

The servers of FIGS. 5-6 may receive (e.g., from computer 600 shown in FIG. 5, or the like) an operation to delete the sandbox tenant. The one or more servers of FIGS. 5-6 may remove, from the immutable storage of the at least one storage device (e.g., a storage device associated with central component 700, the second computer 800, and/or the database systems 1200a-1200d), the key associated with the sandbox tenant without changing the original tenant data.

In some implementations, the server of FIGS. 5-6 may remove a key range from the immutable storage (e.g., a storage device associated with central component 700, the second computer 800, and/or the database systems 1200a-1200d) without removing physical data stored in the immutable storage. The server of FIGS. 5-6 may remove extent references from the immutable storage for the sandbox tenant data that have tenant mapping associated with them when there have been no changes to the sandbox tenant data in the immutable storage after the sandbox creation point in time. The server of FIGS. 5-6 may remove extent references from the immutable storage for a key range of the sandbox tenant data when there have been changes to the sandbox tenant data in the immutable storage so as to replace existing extent references of the original tenant data so as to not include the removed extent references of the sandbox tenant data.

In some implementations, the one or more servers shown in FIGS. 5-6 may store the data in the immutable storage of the at least one storage device (e.g., a storage device associated with central component 700, the second computer

800, and/or the database systems 1200a-1200d) using a log-structured merge tree data structure.

In some implementations, the one or more servers, such as those shown in FIGS. 5-6, may create at least one new sandbox tenant identifier, and may create the at least one new sandbox tenant by associating the at least one new sandbox tenant identifier with the virtual snapshot of the original sandbox tenant data and with new sandbox tenant data created by the at least one new sandbox tenant subsequent to the creation point in time of the at least one new sandbox. The new sandbox tenant data created by the at least one new sandbox tenant subsequent to the creation point in time of the at least one new sandbox may be inaccessible to the original tenant. Subsequent to the creation point in time of the at least one new sandbox, the systems shown in FIGS. 5-6 may create subsequent original sandbox tenant data associated with the original sandbox tenant identifier stored in the immutable storage of the storage device. This subsequent original sandbox tenant data may not be accessible to the at least one new sandbox tenant. The original sandbox tenant may access original sandbox tenant data created both before and after the creation point in time of the at least one new sandbox that is stored in the immutable storage, and the subsequent tenant data of the at least one new sandbox may be created as new tenant data for that at least one new sandbox tenant that does not alter other tenant data stored in the immutable storage.

The one or more servers of the systems shown in FIGS. 5-6 may receive a query including a key indicating the at least one new sandbox tenant operating on data from the immutable storage identified by the key for the at least one new sandbox tenant by dynamically mapping the key indicating the at least one new sandbox tenant to a key indicating the original sandbox tenant. The keys may include a time stamp or sequence indicator. For the at least one new sandbox tenant, the time stamp or sequence indicator may be examined by the database system to determine if the time stamp or sequence identifier indicates that the at least one new sandbox tenant is seeking to access data created before the creation of the at least one new sandbox tenant. In that case, the key is dynamically mapped to the appropriate data that may be accessed by both the original sandbox tenant and the at least one new sandbox tenant. If the time stamp or sequence identifier in the request indicates that the data was created or updated after the creation of the tenant, the request is not so mapped and instead accesses the appropriate transaction that is only accessible to the at least one new sandbox tenant. The one or more servers of the systems shown in FIGS. 5-6 may receive the data from the immutable storage for the at least one new sandbox tenant from the at least one storage device (e.g., the storage device associated with central component 700, the second computer 800, and/or the database systems 1200a-1200d) based on the dynamic mapping of the key indicating the at least one new sandbox tenant.

The one or more servers of the systems shown in FIGS. 5-6 may operate on data so as to retrieve data from the immutable storage based on the mapped key. The servers may translate the data from the immutable storage indicated by the key of the original tenant to data of the key indicating the sandbox tenant and perform an operation on the translated data. The data resulting from the performed operation may be in the immutable storage of a device that is associated with the key of the sandbox tenant, such as the storage device associated with central component 700, second computer 800, and/or one or more of the database systems 1200a-1200d.

The one or more servers of the systems shown in FIGS. 5-6 may receive a query including a key indicating the original sandbox tenant, and may operate on data from the immutable storage of the at least one storage device identified by the key for the original sandbox tenant. The one or more servers receives the data from the immutable storage from the at least one storage device for the at least one new sandbox tenant based on the dynamic mapping of the key indicating the at least one new sandbox tenant.

The servers of FIGS. 5-6 may receive (e.g., from computer 600 shown in FIG. 5, or the like) an operation to delete the at least one new sandbox tenant. The one or more servers of FIGS. 5-6 may remove, from the immutable storage of the at least one storage device (e.g., a storage device associated with central component 700, the second computer 800, and/or the database systems 1200a-1200d), the key associated with the at least one sandbox tenant without changing the original sandbox tenant data.

In some implementations, the server of FIGS. 5-6 may remove a key range from the immutable storage (e.g., a storage device associated with central component 700, the second computer 800, and/or the database systems 1200a-1200d) without removing physical data stored in the immutable storage. The server of FIGS. 5-6 may remove extent references from the immutable storage for the at least one sandbox tenant data that have tenant mapping associated with them when there have been no changes to the at least one new sandbox tenant data in the immutable storage after the at least one new sandbox creation point in time. The server of FIGS. 5-6 may remove extent references from the immutable storage for a key range of the at least one new sandbox tenant data when there have been changes to the at least one new sandbox tenant data in the immutable storage so as to replace existing extent references of the original sandbox tenant data so as to not include the removed extent references of the at least one new sandbox tenant data. The systems and methods of the disclosed subject matter may be for single tenancy and/or multi-tenancy systems. Multi-tenancy systems may allow various tenants, which may be, for example, users, groups of users, or organizations, to access their own records on the server system through software tools or instances on the server system that may be shared among the various tenants. The contents of records for each tenant may be part of a database for that tenant. Contents of records for multiple tenants may all be stored together within the same server system, but each tenant may only be able to access contents of records which belong to, or were created by, that tenant. This may allow a server system to enable multi-tenancy without having to store each tenants' contents of records separately, for example, on separate servers or server systems. The database for a tenant may be, for example, a relational database, hierarchical database, or any other suitable database type. All records stored on the server system may be stored in any suitable structure, including, for example, a LSM tree.

A record as disclosed herein may be identified by a key-value pair in the instance of a multi-tenant system. In the implementations discussed above, the databases may not have notions of tenancy. Tenancy in the databases may be created by one or more virtual overlays, so that a user may view, access, and/or perform operations for a tenancy associated with an authorized user of a database system. The value may be, for example, the contents of a row of a table of a relational database, an identification of a row in a table of a relational database, or any other suitable value. The key may be an identifier for the record, and may in any suitable form, such as, for example, an alphanumeric sequence.

Portions of the key may provide information about the contents of the record. For example, a portion of the key may be a tenant identifier, which may uniquely identify the tenant to whom the contents of the record belongs. Other portions of the key may identify, for example, a table number and identification of a row, for example, when the value of a record is the contents of a row, or table number, index number on the table, and an identification of indexed columns when the value is the identification of a row.

Further, a multitenant system may have various tenant instances on server systems distributed throughout a network with a computing system at each node. The live or production database instance of each tenant may only have its transactions processed at one computer system. The computing system for processing the transactions of that instance may also process transactions of other instances for other tenants.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computerized method for creating at least one new sandbox tenant from an original sandbox tenant of a database system at a point in time, the original sandbox tenant having original sandbox tenant data stored in an immutable storage of the database system associated with an original sandbox tenant identifier, the original sandbox tenant data as of the creation point in time of the at least one new sandbox tenant being a virtual snapshot of the original sandbox tenant data to be made accessible to the at least one new sandbox tenant, where the at least one new sandbox tenant data can be changed or augmented without changing or augmenting the original sandbox tenant data, and the original sandbox tenant data can be changed or augmented without changing or augmenting the at least one new sandbox tenant data, comprising:
  creating, via the database system, at least one new sandbox tenant identifier;
  creating the at least one new sandbox tenant by associating the at least one new sandbox tenant identifier with the virtual snapshot of the original sandbox tenant data and with the at least one new sandbox tenant data created by the at least one new sandbox tenant subsequent to the creation point in time of the at least one new sandbox tenant, wherein the at least one new sandbox tenant data created by the at least one new sandbox tenant subsequent to the creation point in time of the at least one new sandbox tenant is inaccessible to the original sandbox tenant;
  subsequent to the creation point in time of the at least one new sandbox tenant, creating subsequent original sandbox tenant data associated with the original sandbox tenant identifier stored in the immutable storage, the subsequent original sandbox tenant data not accessible to the at least one new sandbox tenant, wherein the original sandbox tenant may access original sandbox tenant data created both before and after the creation point in time of the at least one new sandbox tenant that is stored in the immutable storage, and wherein the subsequent original sandbox tenant data is written as new original sandbox tenant data that does not alter older original sandbox tenant data stored in the immutable storage.

2. The method of claim 1, wherein the at least one new sandbox tenant includes a plurality of new sandbox tenants, wherein each tenant of the plurality of new sandbox tenants has corresponding and separate new sandbox tenant data and new sandbox tenant identifiers that are associated with the virtual snapshot of the original sandbox tenant data.

3. The method of claim 1, wherein the original sandbox tenant is created using a template and at least one from the group consisting of: code, schema, records, and test data from at least one data source.

4. The method of claim 3, further comprising:
  removing the records from the original sandbox tenant that are from the at least one data source before creating the at least one new sandbox tenant.

5. The method of claim 3, further comprising:
  deploying the code and test data; and
  performing verification testing of the deployed code and test data.

6. The method of claim 5, wherein the at least one new sandbox tenant is created from the verification tested original sandbox tenant.

7. The method of claim 1, wherein creating the at least one new sandbox tenant further comprises:
receiving, at the database system, a selection of the original sandbox tenant; and
creating the at least one new sandbox tenant by associating the at least one new sandbox tenant identifier with the virtual snapshot of the original sandbox tenant data of the selected original sandbox tenant.

8. The method of claim 1, further comprising:
receiving a query including a key indicating the at least one new sandbox tenant; and
operating on data from the immutable storage identified by the key for the at least one new sandbox tenant by dynamically mapping the key indicating the at least one new sandbox tenant to a key indicating the original sandbox tenant.

9. The method of claim 8, further comprising:
returning the data from the immutable storage for the at least one new sandbox tenant based on the dynamic mapping of the key indicating the original sandbox tenant.

10. The method of claim 8, wherein the operating on data comprises:
retrieving data from the immutable storage based on the mapped key;
translating the data from the immutable storage indicated by the key of the original sandbox tenant to data of the key indicating the at least one new sandbox tenant;
performing an operation on the translated data; and
storing resultant data from the performed operation in the immutable storage that is associated with the key of the at least one new sandbox tenant.

11. The method of claim 1, further comprising:
receiving an operation to delete the at least one new sandbox tenant; and
removing, from the immutable storage, at least one key associated with the at least one new sandbox tenant without changing or augmenting the original sandbox tenant data.

12. The method of claim 11, wherein the removing the at least one key comprises:
removing a key range from the immutable storage without removing physical data stored in the immutable storage.

13. The method of claim 11, wherein the removing the at least one key comprises:
removing extent references from the immutable storage for the at least one new sandbox tenant data that have original sandbox tenant mapping associated with them when there have been no changes to the at least one new sandbox tenant data in the immutable storage after the creation point in time of the at least one new sandbox tenant.

14. The method of claim 11, wherein the removing the at least one key comprises:
removing extent references from the immutable storage for a key range of the at least one new sandbox tenant data when there have been changes to the at least one new sandbox tenant data in the immutable storage to replace existing extent references of the original sandbox tenant data to not include the removed extent references of the at least one new sandbox tenant data.

15. A system to create at least one new sandbox tenant from an original sandbox tenant at a point in time, the system comprising:
at least one memory, the original sandbox tenant having original sandbox tenant data stored in an immutable storage of the at least one memory associated with an original sandbox tenant identifier, the original sandbox tenant data as of the new sandbox creation point in time being a virtual snapshot of the original sandbox tenant data accessible to the at least one new sandbox tenant, where the at least one new sandbox tenant data can be stored in the at least one memory and can be changed or augmented without changing or augmenting the original sandbox tenant data, and the original sandbox tenant data can be changed or augmented without changing or augmenting the at least one new sandbox tenant data; and
one or more servers for the original sandbox tenant and the at least one new sandbox tenant that are communicatively coupled to the at least one memory, the one or more servers to create at least one new sandbox tenant identifier, to create the at least one new sandbox tenant by associating the at least one new sandbox tenant identifier with the virtual snapshot of the original sandbox tenant data and with data created by the at least one new sandbox tenant subsequent to the creation point in time for the at least one new sandbox tenant, wherein the data created by the at least one new sandbox tenant subsequent to the creation point in time of the at least one new sandbox tenant is inaccessible to the original sandbox tenant, and subsequent to the creation point in time of the at least one new sandbox tenant, to create subsequent original sandbox tenant data associated with the original sandbox tenant identifier stored in the immutable storage of the at least one memory, the subsequent original sandbox tenant data not accessible to the at least one new sandbox tenant, wherein the original sandbox tenant may access tenant data created both before and after the creation point in time of the at least one new sandbox tenant that is stored in the immutable storage, and wherein the subsequent original sandbox tenant data is written as new original sandbox tenant data that does not alter older original sandbox tenant data stored in the immutable storage.

16. The system of claim 15, wherein the at least one new sandbox tenant includes a plurality of new sandbox tenants, wherein each tenant of the plurality of new sandbox tenants has corresponding and separate new sandbox tenant data and new sandbox tenant identifiers that are associated with the virtual snapshot of the original sandbox tenant data.

17. The system of claim 15, wherein the original sandbox tenant is created using a template and at least one from the group consisting of: code, schema, records, and test data from at least one data source.

18. The system of claim 17, wherein the records from the at least one data source are removed from the original sandbox tenant.

19. The system of claim 17, wherein the one or more servers deploy the code and test data, and perform verification testing of the deployed code and test data.

20. The system of claim 19, wherein the at least one new sandbox tenant is created from the verification tested original sandbox tenant.

21. The system of claim 15, wherein the at least one new sandbox tenant is created when the one or more servers receive a selection of the original sandbox tenant, and create the at least one new sandbox tenant by associating the at least one new sandbox tenant identifier with the virtual snapshot of the original sandbox tenant data of the selected original sandbox tenant.

22. The system of claim 15, wherein the one or more servers receive a query including a key indicating the at least one new sandbox tenant, and operate on data from the immutable storage identified by the key for the at least one new sandbox tenant by dynamically mapping the key indicating the at least one new sandbox tenant to a key indicating the original sandbox tenant.

23. The system of claim 22, wherein the data is returned from the immutable storage of the at least one memory for the at least one new sandbox tenant based on the dynamic mapping of the key indicating the original sandbox tenant.

24. The system of claim 22, wherein the wherein the one or more servers operate on the data by retrieving data from the immutable storage based on the mapped key, translating the data from the immutable storage indicated by the key of the original sandbox tenant to data of the key indicating the at least one new sandbox tenant, performing an operation on the translated data, and storing resultant data from the performed operation in the immutable storage that is associated with the key of the at least one new sandbox tenant.

25. The system of claim 15, wherein the one or more servers receive an operation to delete the at least one new sandbox tenant, and remove, from the immutable storage, at least one key associated with the at least one new sandbox tenant without changing or augmenting the original sandbox tenant data.

26. The system of claim 25, wherein the one or more servers remove the at least one key by removing a key range from the immutable storage without removing physical data stored in the immutable storage.

27. The system of claim 25, wherein the one or more servers remove the at least one key by removing extent references from the immutable storage for the at least one new sandbox tenant data that have original sandbox tenant mapping associated with them when there have been no changes to the at least one new sandbox tenant data in the immutable storage after the creation point in time of the at least one new sandbox tenant.

28. The system of claim 25, wherein the one or more servers remove the at least one key by removing extent references from the immutable storage for a key range of the at least one new sandbox tenant data when there have been changes to the at least one new sandbox tenant data in the immutable storage to replace existing extent references of the original sandbox tenant data to not include the removed extent references of the at least one new sandbox tenant data.

* * * * *